(12) United States Patent
Liu

(10) Patent No.: US 10,437,803 B2
(45) Date of Patent: Oct. 8, 2019

(54) INDEX GENERATION APPARATUS AND INDEX GENERATION METHOD

(71) Applicant: NEC Corporation, Tokyo (JP)

(72) Inventor: Jianquan Liu, Tokyo (JP)

(73) Assignee: NEC Corporation, Tokyo (JP)

( * ) Notice: Subject to any disclaimer, the term of this patent is extended or adjusted under 35 U.S.C. 154(b) by 324 days.

(21) Appl. No.: 15/325,270

(22) PCT Filed: Mar. 12, 2015

(86) PCT No.: PCT/JP2015/057352
§ 371 (c)(1),
(2) Date: Jan. 10, 2017

(87) PCT Pub. No.: WO2016/006276
PCT Pub. Date: Jan. 14, 2016

(65) Prior Publication Data
US 2017/0185637 A1      Jun. 29, 2017

(30) Foreign Application Priority Data

Jul. 10, 2014   (JP) .................. 2014-142107

(51) Int. Cl.
*G06F 16/00* (2019.01)
*G06F 16/22* (2019.01)
(52) U.S. Cl.
CPC .............. *G06F 16/2228* (2019.01)
(58) Field of Classification Search
CPC ................ G06F 16/2228; Y10S 707/956
See application file for complete search history.

(56) References Cited

U.S. PATENT DOCUMENTS

2001/0007987 A1\* 7/2001 Igata ................ G06F 16/81
2004/0024738 A1\* 2/2004 Yamane ............ G06F 16/2264
(Continued)

FOREIGN PATENT DOCUMENTS

JP    2000-035965 A    2/2000
JP    2000-276487 A    10/2000
(Continued)

OTHER PUBLICATIONS

Dong, W., et al., "Efficient K-Nearest Neighbor Graph Construction for Generic Similarity Measures," WWW 2011, Mar. 28-Apr. 1, 2011, Hyderabad, India (10 total pgs.).
(Continued)

*Primary Examiner* — Cheryl Lewis
(74) *Attorney, Agent, or Firm* — Wilmer Cutler Pickering Hale and Dorr LLP

(57) ABSTRACT

An index generation apparatus includes: an index generation unit generating the index including a lower node and an upper node by using a degree of similarity between pieces of data, the upper node including an entry having a link relationship with the lower node and indicating representative data, the representative data having the degree of similarity with respect to data indicated by the entry of the lower node that is equal to or greater than a similarity degree threshold value given to the link relationship; and a threshold value determination unit determining a default similarity degree threshold value and an adjustment value with respect to each link relationship between the upper node and the lower node, and determining each similarity degree threshold value to be given to each link relationship by subtracting the adjustment value from the default similarity degree threshold value.

12 Claims, 24 Drawing Sheets

(56) References Cited

U.S. PATENT DOCUMENTS

| | | | | |
|---|---|---|---|---|
| 2010/0057769 A1* | 3/2010 | Lippert | ............ | G06Q 10/00 707/E17.044 |
| 2010/0138426 A1* | 6/2010 | Nakayama | ............ | G06F 16/313 707/741 |
| 2015/0356129 A1* | 12/2015 | Liu | ............ | G06F 16/5838 707/741 |
| 2018/0239807 A1* | 8/2018 | Dhuse | ............ | G06F 16/134 |

FOREIGN PATENT DOCUMENTS

| | | |
|---|---|---|
| JP | 2001-084252 A | 3/2001 |
| JP | 2001-160057 A | 6/2001 |
| JP | 2002-163272 A | 6/2002 |
| JP | 2004-046612 A | 2/2004 |
| JP | 2009-020769 A | 1/2009 |
| JP | 4545641 B2 | 9/2010 |
| JP | 2011-090352 A | 5/2011 |
| JP | 2011-100350 A | 5/2011 |
| JP | 2011-257970 A | 12/2011 |
| JP | 4906900 B2 | 3/2012 |
| JP | 2012-079186 A | 4/2012 |

OTHER PUBLICATIONS

Guttman, A., "R-Trees—A Dynamic Index Structure for Spatial Searching," Association for Computing Machinery, 1984, pp. 47-57.
Milgram, S., "The Small-World Problem," Psychology Today, vol. 1, No. 1, May 1967, pp. 61-67.
T Ravers, J., et al., "An Experimental Study of the Small World Problem," Sociometry, vol. 32, No. 4, Dec. 1969, pgs. (20 total pgs.).
International Search Report corresponding to PCT/JP2015/057352, dated Jun. 9, 2015 (5 total pages).
Partial Translation of Written Opinion corresponding to PCT/JP2015/057352, dated Jun. 9, 2015 (4 total pgs.).
Liu, J., "Ruijido no Kaiso Kankei ni Motoxuku Kikozo Sakuin o Mochiita Koritsuteki na Ruiji Kensaku," Dai 5 Forum on Data Engineering and Information Management (Dai 11 Kai The Database Society of Japan Nenji Taika), May 31, 2013, (10 total pgs.).

\* cited by examiner

INDEX GENERATION APPARATUS AND INDEX GENERATION METHOD

CROSS REFERENCE TO RELATED APPLICATIONS

This application is a national stage application of International Application No. PCT/JP2015/057352 entitled "INDEX GENERATION APPARATUS AND INDEX GENERATION METHOD", filed on Mar. 12, 2015, which claims the benefit of the priority of Japanese Patent Application No. 2014-142107, filed on Jul. 10, 2014, the disclosures of each of which are hereby incorporated by reference in their entirety.

TECHNICAL FIELD

The present invention relates to a data similarity retrieval technique.

BACKGROUND ART

As disclosed in Patent Documents 1 to 10 mentioned below, various similarity retrieval methods have been presently proposed. Such similarity retrieval is often performed on multi-dimensional data or high-dimensional data such as feature value data of an image. For example, Patent Documents 1, 3, and 6 propose a similar image retrieval method. Patent Document 2 proposes a method of retrieving similar data by using a database in which a link for tracing from one data to other data is set between pieces of data. Patent Document 5 proposes a method of hierarchically classifying any image set. Patent Document 7 proposes a method of retrieving a feature vector similar to a query feature vector from a set of high-dimensional feature vectors. Patent Document 9 proposes a method of classifying learning patterns into buckets corresponding to hash values by using a hash function, and searching for a learning pattern which is most similar to an input pattern, among learning patterns belonging to the bucket corresponding to the hash value of the input pattern. Patent Document 10 proposes a data matching method of extracting desired data by designating a condition with respect to multi-dimensional data in which a plurality of feature values can be expressed by vectors. Note that, the wording "high-dimensional" and the wording "multi-dimensional" will be used below without being specially distinguished from each other.

In such similarity retrieval, a degree of similarity between pieces of target data is calculated using a similarity degree function and the like. For example, feature value data of an image is expressed by multi-dimensional numerical value vectors, and a degree of similarity between pieces of feature value data to be compared with each other is calculated by a similarity degree function. Patent Document 4 proposes a method of retrieving a similar feature value by calculating a degree of similarity between feature values with respect to all feature values within a database, storing pieces of ID information of high-order f(x) pieces with their order of a degree of similarity in descending order of the degree of similarity, and retrieving the stored contents.

In addition, an index is constructed with respect to target data, and the similarity retrieval is performed using this index, thereby achieving the speed-up of retrieval. An R-tree has been known as a method of generating an index of multi-dimensional data (see Non-Patent Document 1). In addition, Patent Document 8 proposes a method of dividing a feature vector space into a plurality of approximate regions, thereby generating an indexing tree in which the approximate regions are hierarchized in accordance with the denseness and sparseness of the approximate regions. Note that, Non-Patent Documents 2, 3, and 4 will be described later.

RELATED DOCUMENT

Patent Document

[Patent Document 1] Japanese Patent No. 4545641
[Patent Document 2] Japanese Patent Application Publication No. 2011-090352
[Patent Document 3] Japanese Patent Application Publication No. 2012-079186
[Patent Document 4] Japanese Patent Application Publication No. 2000-035965
[Patent Document 5] Japanese Patent Application Publication No. 2001-160057
[Patent Document 6] Japanese Patent No. 4906900
[Patent Document 7] Japanese Patent Application Publication No. 2011-257970
[Patent Document 8] Japanese Patent Application Publication No. 2002-163272
[Patent Document 9] Japanese Patent Application Publication No. 2009-020769
[Patent Document 10] Japanese Patent Application Publication No. 2004-046612

Non-Patent Document

[Non-Patent Document 1] Antonin Guttman, "R-Trees: A Dynamic Index Structure for Spatial Searching," SIGMOD Conference, 1984, pp. 47-57
[Non-Patent Document 2] Wei Dong, Moses Charikar, and Kai Li, "Efficient k-nearest neighbor graph construction for generic similarity measures," WWW 2011, 577-586
[Non-Patent Document 3] Stanley Milgram, "The Small World Problem," Psychology Today, May 1967, pp. 60-67
[Non-Patent Document 4] J. Travers and S. Milgram, "An experimental study of the small world problem," Sociometry 32, 425, 1969

SUMMARY OF THE INVENTION

However, the above-described similarity retrieval method strongly depends on the data structure of target data, and thus cannot cope with a case where the number of dimensions of target data exceeds a predetermined number, a case where the number of dimensions of target data or an internal data structure such as a data type in each dimension is unknown, and the like. For example, in a method using a space index such as an R-tree, a similarity retrieval process is performed using geometric properties such as a triangle inequality in a distance space. Accordingly, in a case where the number of dimensions or the internal data structure of each dimension is unknown, it is not possible to construct a space index and to perform a similarity retrieval process. Here, the data structure of target data means the data format of the entire target data, the number of dimensions of the target data, the internal structure of data of each dimension, and the like.

The invention is contrived in view of such situations, and provides a versatile similarity retrieval technique that does not depend on the data structure of target data.

In aspects of the invention, the following configurations are adopted in order to solve the above-described problems.

A first aspect relates to an index generation apparatus that generates an index in which a plurality of nodes are hierarchized, each of the nodes including at least one entry indicating data being an index target. The index generation apparatus according to the first aspect comprises: an index generation unit generating the index including a lower node and an upper node by using a degree of similarity between pieces of data, the upper node including an entry having a link relationship with the lower node and indicating representative data, the representative data having the degree of similarity with respect to data indicated by the entry of the lower node that is equal to or greater than a similarity degree threshold value given to the link relationship; and a threshold value determination unit determining a default similarity degree threshold value and an adjustment value with respect to each link relationship between the upper node and the lower node, and determining each similarity degree threshold value to be given to each link relationship by subtracting the adjustment value from the default similarity degree threshold value.

A second aspect relates to an index generation method of generating an index in which a plurality of nodes are hierarchized, each of the nodes including at least one entry indicating data being an index target. The index generation method according to the second aspect comprises: generating the index including a lower node and an upper node, the upper node including an entry having a link relationship with the lower node and indicating representative data, the representative data having a degree of similarity with respect to data being indicated by the entry of the lower node that is equal to or greater than a similarity degree threshold value given to the link relationship; determining a default similarity degree threshold value and an adjustment value with respect to each link relationship between the upper node and the lower node; and determining each similarity degree threshold value to be given to each link relationship by subtracting the adjustment value from the default similarity degree threshold value.

A third aspect relates to a data structure of an index in which a plurality of nodes are hierarchized, each of the nodes including at least one entry indicating data being an index target. The index regarding the third aspect includes: a lower node; and an upper node including an entry having a link relationship with the lower node and indicating representative data, the representative data having a degree of similarity with respect to data indicated by the entry of the lower node that is equal to or greater than a similarity degree threshold value given to the link relationship. A default similarity degree threshold value and an adjustment value are given to each link relationship between the entry of the upper node indicating the representative data and the lower node. The similarity degree threshold value given to the link relationship is calculated by subtracting the adjustment value from the default similarity degree threshold value. The index is referred to by a computer in order for calculating the degree of similarity between the representative data indicated by the entry of the upper node and retrieval target data, comparing the degree of similarity with the similarity degree threshold value given to the link relationship of the entry of the upper node, and obtaining a retrieval result corresponding to the retrieval target data on the basis of a result of the comparison.

Note that, another aspect of the invention may relate to a program causing at least one computer to perform the method of the second aspect, and may relate to a computer readable storage medium having the program recorded thereon. The storage medium includes a non-transitory tangible medium.

According to the above-described aspects, it is possible to provide a versatile similarity retrieval technique that does not depend on the data structure of target data.

BRIEF DESCRIPTION OF THE DRAWINGS

The above-described objects, other objects, features, and advantages will become more apparent from the preferred exemplary embodiments described below, and the accompanying drawings as follows.

DESCRIPTION OF EMBODIMENTS

Hereinafter, exemplary embodiments of the invention will be described. Note that, the following exemplary embodiments are illustrative of the invention, and the invention is not limited to configurations of the following embodiments.

Figure 1:
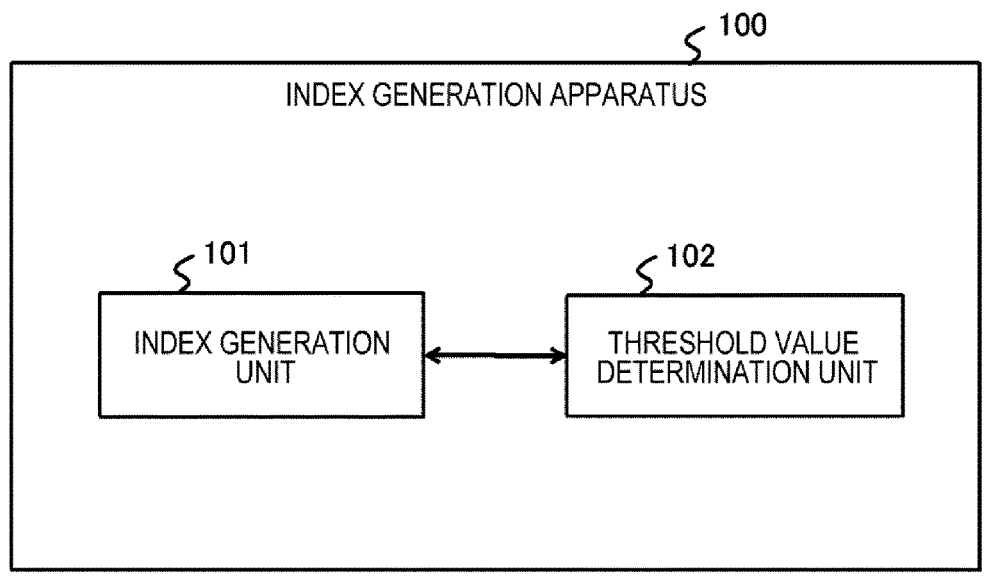
FIG. 1 is a schematic diagram illustrating an example of a configuration of an index generation apparatus according to an exemplary embodiment of the invention.

FIG. 1 is a schematic diagram illustrating an example of a configuration of an index generation apparatus 100 according to an exemplary embodiment of the invention. The index generation apparatus 100 generates an index in which a plurality of nodes are hierarchized, each node including at least one entry indicating data to be indexed. Here, the term "node" means one data element constituting a data structure of an index to be generated, and is realized by, for example, an array, a structure, a class, or the like. In addition, the wording "data to be indexed" means data that is given an index. In the present exemplary embodiment, the data structure of data to be indexed is not limited. That is, the number of dimensions of the data is not limited, and the data structure of data may be unknown. In addition, in the present exemplary embodiment, an association configuration between the entry and the data that are included in the node is not limited. Data may be included in the entry, and a pointer indicating a storage region of data may be included in the entry.

As illustrated in FIG. 1, the index generation apparatus 100 includes an index generation unit 101 and a threshold value determination unit 102. The index generation unit 101 generates the index that includes a lower node and an upper node, by using a degree of similarity between pieces of data. The upper node includes the entry that has a link relationship with the lower node and that indicates representative data having the degree of similarity with respect to data indicated by the entry of the lower node, being equal to or greater than a similarity degree threshold value given to the link relationship. The threshold value determination unit 102 determines a default similarity degree threshold value and an adjustment value with respect to each link relationship between the upper node and the lower node, and determines each similarity degree threshold value that is given to each of the link relationship by subtracting the adjustment value from the default similarity degree threshold value.

The degree of similarity in the present exemplary embodiment means the degree of approximation. As the value of the degree of similarity becomes larger, the degree of approximation increases. In contrast, as the value of the degree of similarity becomes smaller, the degree of approximation decreases. As the degree of similarity, various index values, such as a Euclidean distance, a distance between vectors, the degree of consistency between histograms, and a correlation coefficient, are used. However, a method of calculating the degree of similarity between pieces of data is not limited. The degree of similarity may be calculated by the index generation apparatus 100, or may be calculated by another computer.

In addition, in the present exemplary embodiment, away of forming a link relationship with the lower node based on the entry included in the upper node is not limited. For example, the entry may have a pointer indicating the lower node. In addition, the entry may have an identification ID of the lower node, and the correspondence relationship between the identification ID of the lower node and a pointer indicating the lower node may be held. Further, the entry may have an identification ID of the link, and the correspondence relationship between the identification ID of the link and a pointer indicating the lower node may be held.

For example, the index generation apparatus 100 has a hardware configuration which is the same as that of a high-dimensional data retrieval apparatus 1 in a detailed exemplary embodiment to be described later, and the above-described processing units are realized by programs being processed, similar to the high-dimensional data retrieval apparatus 1.

In addition, an index generation method according to the exemplary embodiment of the invention includes generating an index in which a plurality of nodes are hierarchized, each node including at least one entry indicating data to be indexed. The index generation method is performed by a computer such as the index generation apparatus 100, and includes: generating the index that includes a lower node and an upper node, by using a degree of similarity between pieces of data, the upper node including the entry that has a link relationship with the lower node and that indicates representative data having the degree of similarity with respect to data indicated by the entry of the lower node being equal to or greater than a similarity degree threshold value given to the link relationship; determining a default similarity degree threshold value and an adjustment value with respect to each link relationship between the upper node and the lower node; and determining each similarity degree threshold value that is given to each of the link relationship by subtracting the adjustment value from the default similarity degree threshold value. Note that, steps included in the index generation method may be sequentially performed in random order, or may be simultaneously performed.

Figure 2:
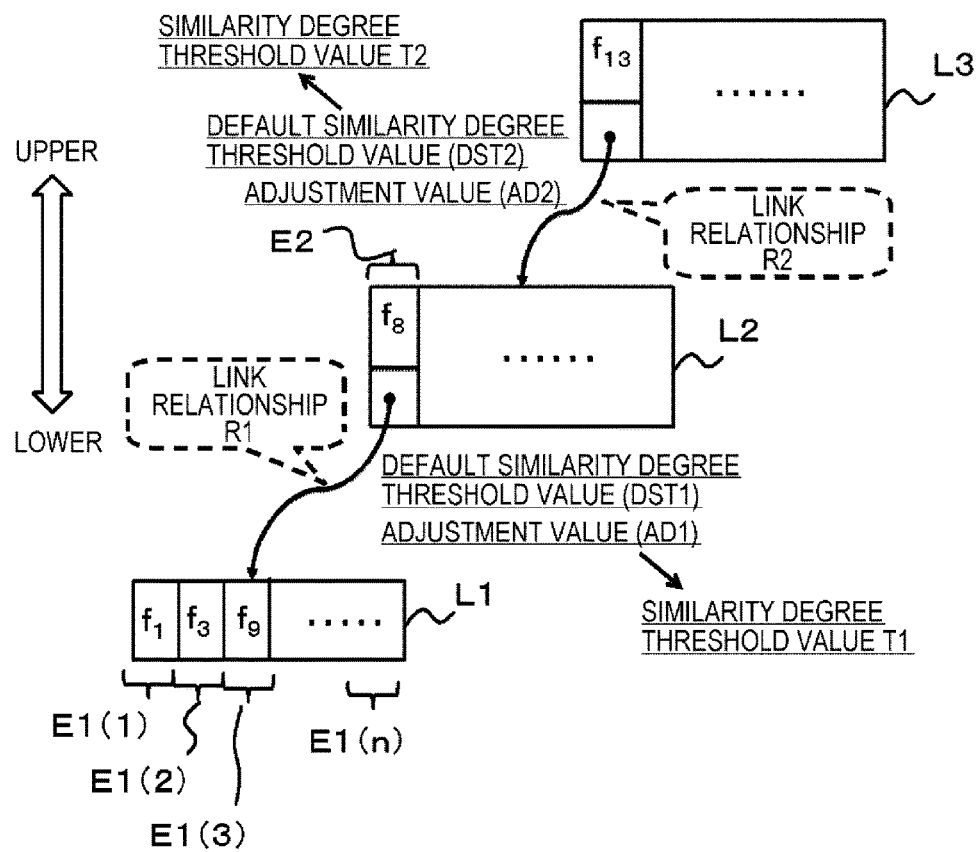
FIG. 2 is a schematic diagram illustrating an example of a portion of an index generated in the present exemplary embodiment.

FIG. 2 is a schematic diagram illustrating an example of a portion of the index generated in the present exemplary embodiment. As illustrated in FIG. 2, in the present exemplary embodiment, it is generated the index that includes the lower node L1 and the upper node L2. The upper node L2 includes the entry E2 having the link relationship R1 with the lower node L1, and indicating representative data f8. The representative data f8 has the degrees of similarity with respect to pieces of data (f1, f3, f9, and the like) indicated by entries E1(1), E1(2), E1(3), and E1($n$) of the lower node L1, being equal to or greater than the similarity degree threshold value T1 given to the link relationship R1. Further, default similarity degree threshold values DST1 and DST2 and adjustment values AD1 and AD2 are determined for the link relationships between upper nodes and lower nodes. The similarity degree threshold value T1 given to the link relationship R1 is determined by subtracting the adjustment value AD1 from the default similarity degree threshold value DST1, and the similarity degree threshold value T2 given to the link relationship R2 is determined by subtracting the adjustment value AD2 from the default similarity degree threshold value DST2. Note that, although the entry indicating the representative data f8 is included only in the upper node L2 in the example of FIG. 2, it may be included in each of the upper node L2 and the lower node L1.

Hereinafter, operations and effects of the present exemplary embodiment will be described together with a technical idea embodied by the present exemplary embodiment.

The inventor focuses on the rule in which data A and data C are similar to each other in a case where the data A and data B are similar to each other and the data B and the data C are similar to each other (Non-Patent Document 2), and has obtained an idea of adopting the rule to the data structure of an index for similarity retrieval. The rule is not always true, but is highly likely to be true. As an example in a real world in this respect, a so-called SMALL-WORLD theory is known (see Non-Patent Documents 3 and 4 mentioned above). That is, this theory indicates that there is a high possibility in the real world that a person A and a person C are friends in a case where the person A and a person B are friends and the person B and the person C are friends.

Here, three pieces of data to be indexed are denoted by fa, fb, and fc, a set of pieces of data fi to be indexed are denoted by F, and retrieval target data is denoted by fq. Here, it is assumed that the data fb belongs to the set F, and the data fb is representative of all pieces of data included in the set F. In this case, the above-mentioned rule can be expressed by the following expressions. In the following expressions, sim ( ) is a function for calculating the degree of similarity between two pieces of data, and can also be used to calculate the degree of similarity between data and the set of data. Here, δ denotes a threshold value of the degree of similarity.

[Expression 1]

$$\text{sim}(f_a, f_b) \geq \delta \wedge \text{sim}(f_b, f_c) \geq \delta \Rightarrow \text{sim}(f_a, f_c) \geq \delta \quad (1)$$

$$\text{sim}(f_q, f_b) \geq \delta \wedge \text{sim}(f_b, f_c) \geq \delta \Rightarrow \text{sim}(f_q, f_c) \geq \delta \quad (2)$$

$$\text{sim}(f_q, f_b) \geq \delta \wedge \text{sim}(f_b, F) \geq \delta \Rightarrow \text{sim}(f_q, F) \geq \delta \quad (3)$$

Expression (1) mentioned above indicates the above-described rule. That is, Expression (1) mentioned above indicates that the degree of similarity between data fa and data fc is equal to or greater than the threshold value δ, in a case where the degree of similarity between the data fa and data fb is equal to or greater than the threshold value δ and the degree of similarity between the data fb and the data fc is equal to or greater than the threshold value δ. Here, Expression (2) mentioned above is established by replacing the data fa in Expression (1) with the retrieval target data fq. That is, in a case where the degree of similarity between the data fq and data fb is equal to or greater than the threshold value δ and the degree of similarity between the data fb and the data fc is equal to or greater than the threshold value δ, it can be determined that the degree of similarity between the data fq and the data fc is equal to or greater than the threshold value δ.

Further, Expression (3) mentioned above is established by replacing the data fc in Expression (2) mentioned above with the data set F. That is, in a case where the degree of similarity between the data fq and the data fb is equal to or greater than the threshold value δ and the degree of similarity between the data fb and the data set F is equal to or greater than the threshold value δ, it can be determined that the degree of similarity between the data fq and the data set F is equal to or greater than the threshold value δ.

As described above, the data fb is representative of all pieces of data included in the set F. Accordingly, according to Expression (3) mentioned above, when the degree of similarity between the data fb and each data fi included in the data set F is calculated in advance, similarity between the retrieval target data fq and each data fi in the data set F can be determined without calculation just by calculating the degree of similarity between the retrieval target data fq and the representative data fb. The inventor has adopted such the rule for the data structure of the index in the present exemplary embodiment.

According to FIG. 2, the lower node L1 is equivalent to the data set F, and the representative data f8 is equivalent to the representative data fb of the set F. In the lower node L1, an entry indicating data having a degree of similarity with respect to the representative data f8 being equal to or greater than the similarity degree threshold value T1 is set. Thereby, according to the present exemplary embodiment, only a degree of similarity between the representative data f8 and the retrieval target data fq is calculated, and thus a degree of similarity between the retrieval target data fq and a data set indicated by the lower node L1 can be determined without calculation. For example, in a case where a degree of similarity between the representative data f8 and the retrieval target data fq is less than the similarity degree threshold value T1, a degree of similarity between the retrieval target data fq and each of all pieces of data indicated by the lower node L1 can also be determined to be less than the similarity degree threshold value T1 without calculation of a degree of similarity.

In this manner, in the present exemplary embodiment, an index is generated which has a tree structure in which hierarchization is performed on the basis of a degree of similarity between pieces of data without depending on a data structure of target data. Further, the generation of an index in the present exemplary embodiment also does not depend on the number of dimensions of target data. This is because an index is generated on the basis of a degree of similarity between pieces of data without depending on geometric properties corresponding to a dimension of data in the present exemplary embodiment.

Therefore, it is possible to perform similarity retrieval even in a case where a data structure of target data is unknown, a case where target data is high-dimensional data, and the like by using an index generated by the present exemplary embodiment. That is, according to the present exemplary embodiment, it is possible to provide a versatile similarity retrieval technique that does not depend on a data structure of target data.

Further, in the present exemplary embodiment, a default similarity degree threshold value and an adjustment value are determined with respect to a link relationship between an upper node and a lower node link relationship, and a data group indicated by the lower node is determined on the basis of a similarity degree threshold value obtained by subtracting the adjustment value from the default similarity degree threshold value. In other words, a value obtained by alleviating a threshold value (default similarity degree threshold value) regarding a degree of similarity by an adjustment value is used as a final similarity degree threshold value, and entries of each node are determined. Thereby, it is possible to make a set of similar pieces of data likely to be collected in one node.

This effect will be further described on the basis of a specific example. In a case where one threshold value is used, pieces of data having a degree of similarity (0.86) are arranged in a lower node corresponding to the threshold value (0.85), but pieces of data having a degree of similarity (0.84) are not arranged. However, there is a possibility that the pieces of data having a degree of similarity (0.84) and the pieces of data having a degree of similarity (0.86) are sufficiently approximated to each other. On the other hand, according to the present exemplary embodiment, a threshold value (0.8) obtained by alleviating a default similarity degree threshold value (0.85) by an adjustment value (0.05) is used. Accordingly, both the pieces of data having a degree of similarity (0.86) and the pieces of data having a degree of similarity (0.84) are arranged in a lower node corresponding to a default threshold value (0.85).

According to the present exemplary embodiment, it is possible to erroneously reduce data excluded from a target for comparison during similarity retrieval and to improve a recall ratio of the similarity retrieval by making a set of pieces of similar data likely to be collected in one node. Here, the recall ratio (Recall) of similarity retrieval is a value obtained by setting the number of results, serving as correct answers of similarity retrieval, as a denominator and setting the number of results obtained by actual similarity retrieval as a numerator. Further, the collection of a set of pieces of similar data in one node is facilitated, and thus the number of entries to be compared with each other is likely to be limited in similarity retrieval. As a result, it is possible to improve a processing speed of the similarity retrieval.

Therefore, according to the present exemplary embodiment, it is possible to prevent a reduction in the efficiency of retrieval due to an increase in the number of dimensions of target data and to improve a recall ratio of similarity retrieval by reducing the amount of calculation of a degree of similarity. Note that, according to the proposed method described in the background of the invention, overlapping of nodes within a space index occurs in a large amount due to an increase in the number of dimensions of data, and thus all pieces of data are scanned during retrieval, thereby sharply deteriorating the efficiency of retrieval. In addition, in the present exemplary embodiment, an index is generated on the basis of a degree of similarity between pieces of data, and thus a method of calculating a degree of similarity may be a black box. Therefore, according to the present exemplary embodiment, it is possible to provide a versatile and efficient similarity retrieval technique that does not depend not only on a data structure of target data but also on a method of calculating a degree of similarity.

Hereinafter, the above-described exemplary embodiment will be described in more detail. Hereinafter, as detailed exemplary embodiments, a first exemplary embodiment, a second exemplary embodiment, and a third exemplary embodiment will be described. The following exemplary embodiments are examples in a case where the above-described index generation apparatus and index generation method are applied to a high-dimensional data retrieval apparatus. Note that, the above-described index generation apparatus and index generation method are not limited to being applied to the retrieval apparatus that deals with high-dimensional data, and can be applied to various data retrieval apparatuses capable of calculating the degree of similarity.

[First Exemplary Embodiment]
[Configuration of Apparatus]

Figure 3:
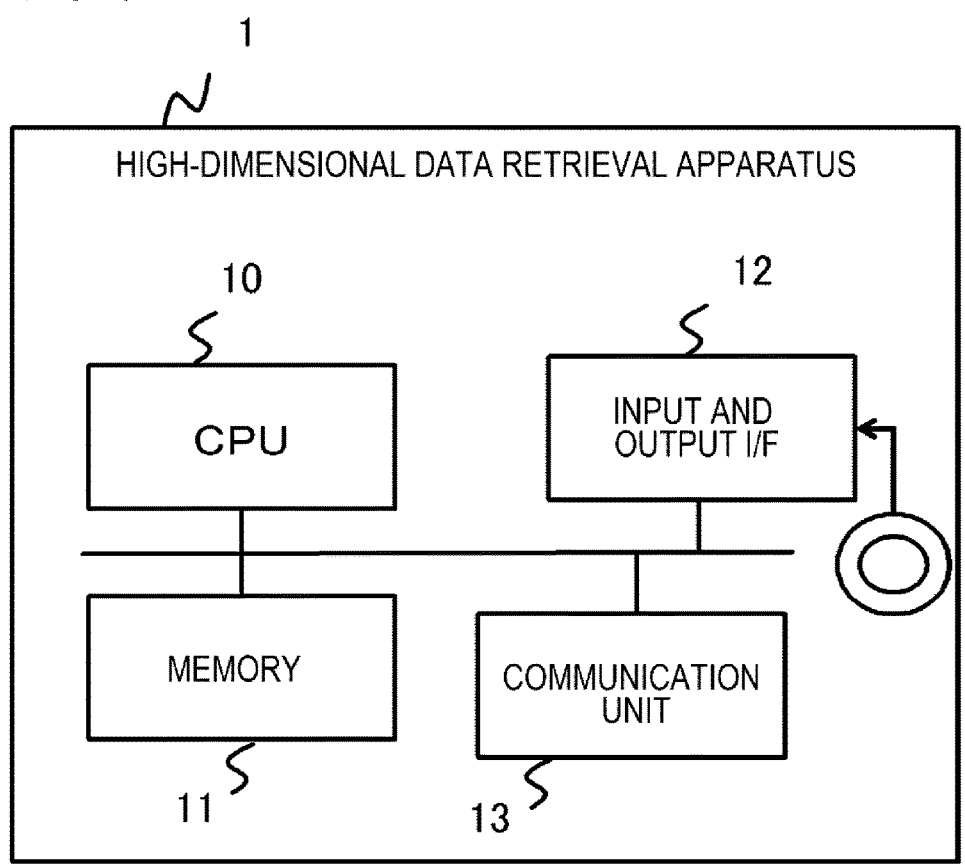
FIG. 3 is a schematic diagram illustrating an example of a hardware configuration of a high-dimensional data retrieval apparatus (retrieval apparatus) in a first exemplary embodiment.

FIG. 3 is a schematic diagram illustrating an example of a hardware configuration of a high-dimensional data retrieval apparatus (hereinafter, simply referred to as a retrieval apparatus) 1 in the first exemplary embodiment. The retrieval apparatus 1 in the first exemplary embodiment includes a central processing unit (CPU) 10, a memory 11, an input and output interface (I/F) 12, a communication unit 13, and the like as a hardware configuration, as illustrated in FIG. 3. These hardware elements are connected to each other by, for example, a bus.

The memory 11 is a random access memory (RAM), a read only memory (ROM), a hard disk, or the like. The input and output I/F 12 can be connected to an input device (not shown), such as a keyboard or a mouse, which receives an input of a user's operation, an output device (not shown), such as a display device or a printer, which provides information to a user, and the like. The communication unit 13 communicates with another computer through a communication network, and transmits and receives a signal to and from another apparatus. A portable storage medium and the like may also be connected to the communication unit 13. Note that, the retrieval apparatus 1 may not include an input device or an output device, and the hardware configuration of the retrieval apparatus 1 is not limited.

The retrieval apparatus 1 acquires index target data, and generates an index having the data structure shown in the above-described exemplary embodiment on the basis of the acquired index target data. In addition, the retrieval apparatus 1 acquires retrieval target data and a similarity degree condition, and retrieves data that satisfy the similarity degree condition with respect to the retrieval target data, by using the index generated as described above (similarity retrieval). In the present exemplary embodiment, the index generated by the retrieval apparatus 1 may also be referred to as similarity degree tree. The similarity degree tree means the index having a hierarchical structure based on the degree of similarity. A portion of the retrieval apparatus 1 is equivalent to the above-described index generation apparatus 100.

[Processing Configuration]

Figure 4:
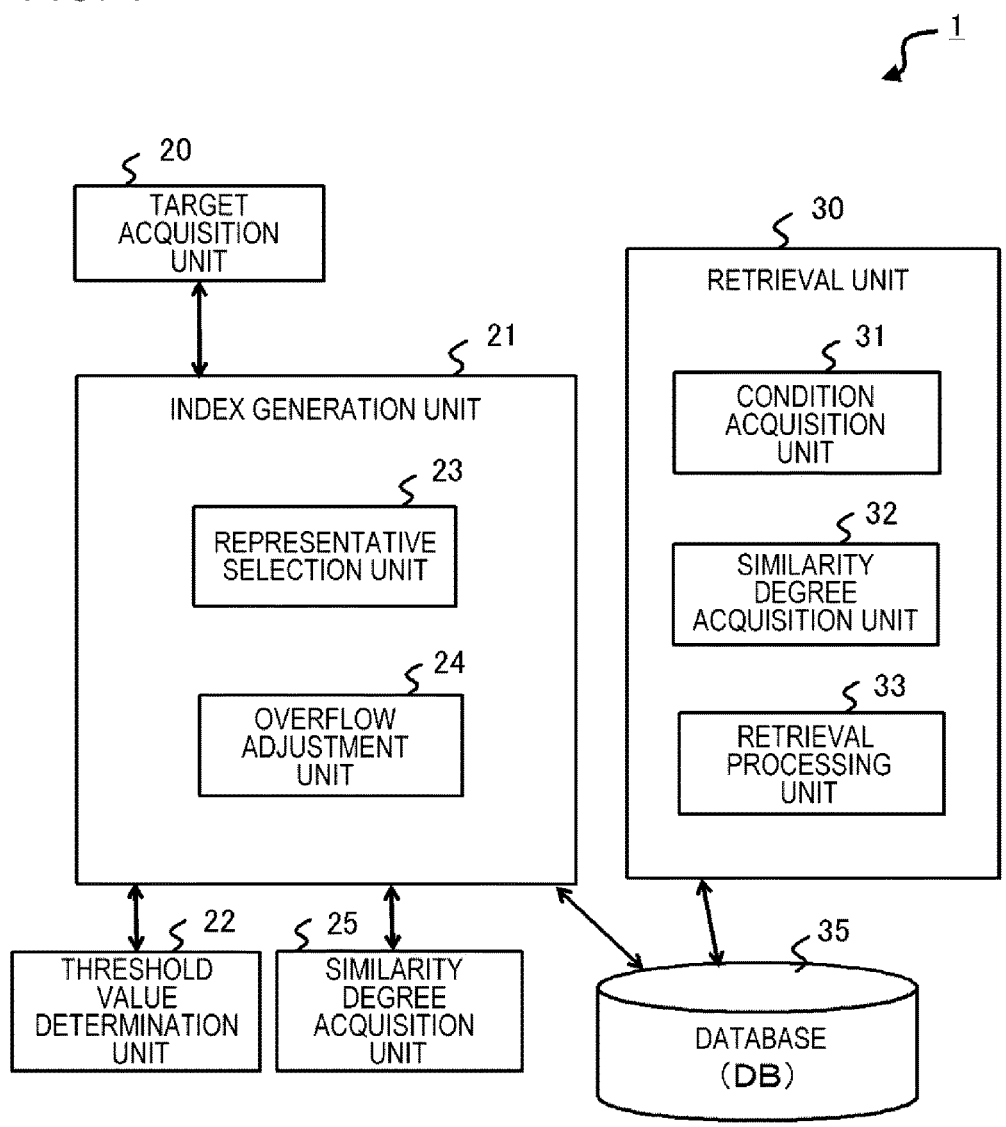
FIG. 4 is a schematic diagram illustrating an example of a processing configuration of the high-dimensional data retrieval apparatus (retrieval apparatus) in the first exemplary embodiment.

FIG. 4 is a schematic diagram illustrating an example of a processing configuration of the retrieval apparatus 1 in the first exemplary embodiment. The retrieval apparatus 1 in the first exemplary embodiment includes a target acquisition unit 20, an index generation unit 21, a threshold value determination unit 22, a similarity degree acquisition unit 25, a retrieval unit 30, a database 35, and the like. For example, these processing units are realized by the CPU executing programs stored in the memory 11. In addition, the programs may be installed from a portable storage medium, such as a compact disc (CD) or a memory card, or another computer on a network through the input and output I/F 12, and may be stored in the memory 11.

The target acquisition unit 20 acquires high-dimensional feature value data, such as a video, as index target data. The feature value data may be information input by a user operating an input device on the basis of an input screen or the like, or may be information acquired through the input and output I/F 12 or the communication unit 13 from a portable storage medium, another computer, or the like.

The similarity degree acquisition unit 25 calculates the degree of similarity between two pieces of feature value data. In the present exemplary embodiment, a method of calculating the degree of similarity by the similarity degree acquisition unit 25 is not limited. The similarity degree acquisition unit 25 may calculate the degree of similarity by using an application programming interface (API) in which internal processes provided from the outside is configured as a black box, a library, or the like. In addition, the similarity degree acquisition unit 25 can also acquire the degree of similarity calculated by another computer.

The index generation unit 21 generates and updates the similarity degree tree, which is the index of feature value data acquired by the target acquisition unit 20, similar to the index generation unit 101 in the above-described index generation apparatus 100. Data of the similarity degree tree generated and updated is stored in the database 35. Note that, the data of the similarity degree tree may be stored in a portable storage medium through the input and output I/F 12, and may be transmitted to another computer through the communication unit 13.

The present exemplary embodiment adopts a configuration in which nodes constituting the similarity degree tree have the following data structure. The entry of the upper node having the link relationship with the lower node includes the pointer indicating the lower node, the default similarity degree threshold value and the adjustment value calculated with respect to the link relationship, and the feature value data indicated by the entry. Here, the entry can also have the similarity degree threshold value which is calculated from the default similarity degree threshold value and the adjustment value, instead of or together with the default similarity degree threshold value and the adjustment value. The entry in the upper node that does not have the link relationship with the lower node includes feature value data indicated by the entry. In addition, each entry included in the node, which does not have any entry including the pointer to the lower node, includes a pointer indicating a storage region within the database 35 of feature value data indicated by each entry. In addition, the feature value data included in the entry having a pointer to the lower node set therein is also set in the entry included in the lower node, or the pointer to the feature value data is set in the entry included in the lower node.

Hereinafter, the node that does not have any entry including the pointer to the lower node may be referred to as leaf node, and the node that has at least one entry including the pointer to the lower node may be referred to as intermediate node. In addition, the uppermost node among intermediate nodes may be referred to as root node. Accordingly, according to FIG. 2, the node L3 may be referred to as root node or intermediate node, the node L2 may be referred to as intermediate node, and the node L1 may be referred to as leaf node.

In addition, a relationship between the upper node and the lower node linked by the pointer of the entry included in the upper node may be referred to as parent-child relationship, and the upper node and the lower node having the parent-child relationship may also be referred to as parent node and lower node, respectively. Accordingly, according to FIG. 2, in a relationship between the node L2 and the node L1, the node L2 may be referred to as parent node, and the node L1 may be referred to as child node.

When the index generation unit 21 reflects feature value data of the target acquired by the target acquisition unit 20 on the similarity degree tree, the index generation unit determines a node serving as an insertion destination of the entry including the feature value data of the target as follows. The index generation unit 21 acquires the degree of similarity between the feature value data of the target and the feature value data included in the entry of the intermediate node including the pointer to the lower node from the similarity degree acquisition unit 25, and compares the degree of similarity with the similarity degree threshold value that is calculated from the default similarity degree threshold value and the adjustment value included in the entry. Based on the result of the comparison, the index generation unit 21 determines the intermediate node or the lower node as the insertion destination of the entry including the feature value data of the target. Specifically, the index generation unit 21 determines the insertion destination of the entry including the feature value data of the target to be the lower node when the degree of similarity is equal to or greater than the similarity degree threshold value, and determines the insertion destination of the entry including the feature value data of the target to be the intermediate node when the degree of similarity is less than the similarity degree threshold value.

In addition, the index generation unit 21 includes a representative selection unit 23 and an overflow adjustment unit 24.

The representative selection unit 23 selects a representative entry among a plurality of entries during the addition or deletion of feature value data, if necessary. This is equivalent to the selection of the representative data fb from the data set F. Accordingly, the representative entry means the entry indicating the feature value data that is selected as the representative. In addition, the feature value data included in the representative entry is also referred to as representative feature value data. Specifically, when adding the new entry, the representative selection unit 23 selects the representative entry from the target entry set that includes the new entry and the entries included in the target node, which is determined to be the insertion destination of the new entry. The entries in the target node included in the target entry set may be all entries included in the target node, or may be only entries that do not include a pointer to the lower node among all of the entries included in the target node. In a case where all of the entries included in the target node are included in the target entry set, an existing child node may be required to be constructed again.

For example, the representative selection unit 23 selects the representative entry by using any one of the following two selection methods. However, in the present exemplary embodiment, the representative entry selection method is not limited to the following method. The representative selection unit 23 may randomly select any entry as the representative entry by using a method other than the following two selection methods.

In the first selection method, the representative selection unit 23 selects the entry indicating feature value data for which dispersion of degrees of similarity with feature value data indicated by other entries is minimized, as the representative entry. This method can be expressed by the following expression. The representative selection unit 23 calculates all degrees of similarity between feature value data fi and other feature value data fj with respect to the pieces of feature value data fi belonging to the set F, as expressed by the following expression, and selects feature value data fi for which a dispersion value σ of the distribution of degrees of similarity is minimized, as the representative of the set F. However, in the first selection method, the entry selected as the representative entry is not limited to the entry indicating data for which the dispersion of degrees of similarity with pieces of data is minimized. The representative entry may be preferentially selected from entries indicating data for which the dispersion of degrees of similarity with pieces of data is small. For example, the entry indicating data having the second smallest dispersion may be selected as the representative entry.

$$\underset{f_i \in F}{\operatorname{argmin}} \{\sigma_{f_i} \mid \sigma \text{ is dispersion of } sim(f_i, f_j), f_j \in F\} \quad \text{[Expression 2]}$$

In a second selection method, the representative selection unit 23 selects the entry indicating data for which the number of pieces of data indicated by another entry being closest to the entry is maximized, as the representative entry. This method can be expressed by the following expression. Regarding pieces of feature value data fi belonging to the set F, the representative selection unit 23 selects feature value data fi for maximizing the number of other pieces of feature value data RNN (Reverse Nearest Neighbors) (fi), which are closest to the feature value data fi, as the representative of the set F as expressed by the following expression. However, in the second selection method, the entry selected as the representative entry is not limited to only the entry indicating data for which the number of pieces of data is maximized. The representative entry may be preferentially selected from entries indicating data for which the number of pieces of data is large. For example, the entry indicating data for which the number of pieces of data is the second largest may be selected as the representative entry.

$$\underset{f_i \in F}{\mathrm{argmax}}\{|RNN(f_i)|\} \qquad \text{[Expression 3]}$$

In a case where the number of entries of the target entry set including entries included in the target node, which is determined to be the insertion destination of the new entry, and the new entry exceeds a predetermined entry threshold value, the overflow adjustment unit 24 divides the node into the child node and the parent node. In this manner, the division of the node into the parent node and the child node is also referred to as overflow adjustment. In the overflow adjustment, the overflow adjustment unit 24 makes the representative selection unit 23 select the representative entry from the above-mentioned target entry set, and makes the threshold value determination unit 22 determine a new default similarity degree threshold value or the new similarity degree threshold value. The overflow adjustment unit 24 selects the entry indicating feature value data having the degree of similarity with respect to feature value data, indicated by the selected representative entry, being equal to or greater than the new default similarity degree threshold value or the new similarity degree threshold value from the target entry set other than the selected representative entry, and generates the lower node (child node) including the selected entry. The overflow adjustment unit 24 sets the pointer to the lower node, the new default similarity degree threshold value, and the new adjustment value in the representative entry selected in the target node (parent node). Here, the representative entry may be included in both the child node and the parent node, or may be included in only the parent node.

The threshold value determination unit 22 determines similarity degree threshold values, similar to the threshold value determination unit 102 in the above-described index generation apparatus 100. Specifically, the threshold value determination unit 22 determines the default similarity degree threshold value and the adjustment value with respect to each link relationship, and determines similarity degree threshold values by subtracting the adjustment value from the default similarity degree threshold value. In the present exemplary embodiment, the default similarity degree threshold value and the adjustment value are set in the representative entry, and thus the threshold value determination unit 22 extracts the default similarity degree threshold value and the adjustment value from the representative entry whenever the similarity degree threshold value is required, and calculates the similarity degree threshold value from the values. Hereinafter, the default similarity degree threshold value may be referred to as DS threshold value, and the similarity degree threshold value determined by subtracting the adjustment value from the default similarity degree threshold value may be referred to as S threshold value.

According to the example of FIG. 2, the default similarity degree threshold value DST1 and the adjustment value AD1 are set in the representative entry E2 of the node L2, and the default similarity degree threshold value DST2 and the adjustment value AD2 are set in the representative entry of the node L3. The threshold value determination unit 22 calculates the similarity degree threshold value T1 from the default similarity degree threshold value DST1 and the adjustment value AD1 if necessary, and calculates the similarity degree threshold value T2 from the default similarity degree threshold value DST2 and the adjustment value AD2.

The DS threshold value is determined during the overflow adjustment of the overflow adjustment unit 24. The threshold value determination unit 22 may have a list of DS threshold values which are candidates for selection in advance, and may select one DS threshold value given to the target link from the list. In addition, the threshold value determination unit 22 can also determine the new DS threshold value by using the following method. However, a method of determining the DS threshold value is not limited.

For example, the threshold value determination unit 22 can determine new DS threshold values so that the new DS threshold values have intervals equal to the intervals of DS threshold values which are determined already. In this example, a similarity degree range from 0 to 1 is divided at equal intervals, thereby determining DS threshold values. For example, a similarity degree range section of [0,1] is equally divided into 10 parts at equal intervals of 0.1, and DS threshold values are determined to be numerical values at respective division points. In this case, the DS threshold values are determined to be values such as 0.1, 0.2, 0.3, . . . , 0.9, and 1.0.

As another example, the threshold value determination unit 22 can determine a value obtained by recursively dividing the DS threshold value, which is determined already, and a maximum degree of similarity into two parts to be the new DS threshold value. In this example, the similarity degree range from 0 to 1 is recursively divided into log scales, thereby determining DS threshold values. For example, the first DS threshold value is set to 0.2, and the second DS threshold value is determined to be 0.6 which is a division point obtained by equally dividing a range from 0.2 to 1.0 into two parts. In this manner, division into two equal parts is repeated, and thus the third DS threshold value and the subsequent DS threshold values are determined to be 0.8, 0.9, 0.95, 0.975, 0.9875, and the like.

As another example, the threshold value determination unit 22 can determine a value obtained from degrees of similarity between representative feature value data and each of the other pieces of feature value data in a set of feature value data which are targets for overflow adjustment, to be the new DS threshold value. For example, the threshold value determination unit 22 determines the degree of similarity which is the center value among a plurality of degrees of similarity calculated, to be the new DS threshold value. In a case where degrees of similarity between representative feature value data and each of five pieces of feature value data included in the data set are 0.5, 0.3, 0.6, 0.9, and 0.95, the new DS threshold value is determined to be the center value of 0.6. In addition, a value between the maximum value and the minimum value among a plurality of degrees of similarity calculated may be equally divided into two parts, and a division point thereof may be determined to be the new DS threshold value.

The adjustment value is determined and updated at a timing corresponding to the determination method. The threshold value determination unit 22 determines adjustment values by using, for example, the following method. However, a method of determining an adjustment value is not limited to only the following method.

«First Determination Method for Adjustment Value»

The threshold value determination unit 22 determines the adjustment value so that the adjustment value becomes smaller as the DS threshold value becomes larger. In this method, the threshold value determination unit 22 determines the DS threshold value as described above, and then determines the adjustment value on the basis of the determined DS threshold value. That is, in this method, the adjustment value is determined during the overflow adjustment of the overflow adjustment unit 24. For example, the threshold value determination unit 22 has the maximum value of the adjustment value and a function for outputting an output value, indicating a positive correlation with the DS threshold value, using the DS threshold value as an input in advance, and can determine a value obtained by subtracting an output value, obtained by substituting the determined DS threshold value for the function, from the maximum value to be the adjustment value.

In addition, the first determination method may be realized as follows. The threshold value determination unit 22 sets the DS threshold value to be a value which becomes larger as the hierarchy gets lower, and sets the adjustment value to be a value which becomes smaller as the hierarchy gets lower. For example, the threshold value determination unit 22 determines a value, obtained by dividing a constant (for example, 0.1) by a hierarchical position h, to be the adjustment value using the h to which 1 is added for each hierarchy by setting the uppermost hierarchy to 1. However, a specific method of determining the adjustment value in the first determination method is not limited to such an example.

«Second Determination Method for Adjustment Value»

The threshold value determination unit 22 determines the adjustment value, regarding the link relationship between the lower node and the representative entry (upper node) indicating representative feature value data, to be a value which becomes smaller as the degree of dispersion of degrees of similarity between the representative feature value data indicated by the upper node and each of a plurality of pieces of feature value data indicated by entries of the lower node becomes smaller. In this method, the degree of dispersion also varies in accordance with the change of a feature value data group indicated by the lower node. Accordingly, in this method, the adjustment value is newly determined during the overflow adjustment of the overflow adjustment unit 24, and is updated from the original value during the insertion of the entry into the node (addition of feature value data).

For example, the threshold value determination unit 22 determines a value, obtained by dividing a standard deviation of degrees of similarity between representative feature value data indicated by the upper node and each of a plurality of pieces of feature value data indicated by entries of the lower node by the number of entries of the lower node, to be the adjustment value regarding the link relationship between the lower node and the representative entry (upper node) indicating the representative feature value data. Here, it is desired that an entry threshold value is used as the number of entries dividing the standard deviation. However, a value which is equal to or greater than half of the entry threshold value or less than the entry threshold value may be used as the number of entries. Here, a specific method of determining the adjustment value in the second determination method is not limited to such an example.

In this manner, in the second determination method, in a case where the new entry is inserted into the node, the above-mentioned degree of dispersion of degrees of similarity is determined as described above, in addition to new feature value data indicated by the new entry, and the adjustment value which is already set is updated. On the other hand, the node serving as the insertion destination is determined on the basis of the S threshold value which is calculated from the DS threshold value, which is already set, and the adjustment value during the insertion of the new entry. Accordingly, the feature value data that does not satisfy conditions of the S threshold value given to the link relationship between the node and the upper node may be included in the feature value data group indicated by the node due to the updating of the adjustment value after the insertion of the entry. In order to exclude such a case, the threshold value determination unit 22 first determines a temporary adjustment value during the insertion of the entry, and determines a temporary similarity degree threshold value from the DS threshold value and the temporary adjustment value. The index generation unit 21 determines whether or not the feature value data group indicated by the node after the insertion of the entry satisfies conditions of the temporary similarity degree threshold value, and changes the node to serve as the insertion destination on the basis of the determination result. The threshold value determination unit 22 updates the adjustment value and the S threshold value, which are set already, to the temporary adjustment value and the temporary similarity degree threshold value in a case where the node to serve as the insertion destination is not changed according to the determination result obtained by the index generation unit 21.

In addition, in a case where the threshold value determination unit 22 uses the second determination method, the overflow adjustment unit 24 uses the DS threshold value in order to select the entry to be included in a new child node among entries within the original node. That is, the overflow adjustment unit 24 selects the entry including feature value data having the degree of similarity with respect to feature value data included in the selected representative entry being equal to or greater than the DS threshold value determined by the threshold value determination unit 22, and generates the lower node (child node) including the selected entry. The threshold value determination unit 22 determines the adjustment value on the basis of the feature value data group indicated by the child node generated in this manner using the DS threshold value, and calculates the S threshold value from the DS threshold value which is previously determined and the adjustment value. Note that, in a case where the threshold value determination unit 22 uses the first determination method, the adjustment value is determined without depending on the feature value data group indicated by the node, and thus the S threshold value is used in selecting the entry to be included in the new child node.

The database 35 stores the feature value data group which is the index target, information of the similarity degree tree generated by the index generation unit 21, and information regarding the similarity degree tree (the degree of similarity calculated for the generation of the similarity degree tree, and the like). A data group which is the index target is data having a certain attribute for forming data in a table format, the database 35 may store the data in a table format. The database 35 is realized on an external memory, such as a hard disk, which is included in the memory 11. In addition, in order to generate the similarity degree tree and to increase the speed of retrieval, information regarding nodes other than leaf nodes of the similarity degree tree stored in the database 35 are buffered in a main storage included in the memory 11.

The retrieval unit 30 retrieves feature value data that satisfy the similarity degree condition with respect to retrieval target data, from the feature value data group stored in the database 35 by using the similarity degree tree generated by the index generation unit 21. Data of retrieval results may be output to a display device or a printing device through the input and output I/F 12, may be stored in a portable storage medium through the input and output I/F 12, or may be transmitted to another computer through the communication unit 13.

The retrieval unit 30 includes a condition acquisition unit 31, a similarity degree acquisition unit 32, and a retrieval processing unit 33, as illustrated in FIG. 4.

The condition acquisition unit 31 acquires the feature value data to be retrieved and the similarity degree condition. The feature value data to be retrieved may be information which is input by a user operating an input device on the basis of an input screen or the like, or may be information which is acquired through the input and output I/F 12 or the communication unit 13 from a portable storage medium, another computer, or the like.

The similarity degree acquisition unit 32 is the same as the similarity degree acquisition unit 25. Specifically, the similarity degree acquisition unit 32 acquires the degree of similarity between representative feature value data and the feature value data to be retrieved which is acquired by the condition acquisition unit 31. In the retrieval apparatus 1, the similarity degree acquisition unit 25 and the similarity degree acquisition unit 32 may be shared as one processing unit.

The retrieval processing unit 33 compares the degree of similarity acquired by the similarity degree acquisition unit 32 and the similarity degree threshold value or the similarity degree condition acquired by the condition acquisition unit 31, and excludes the entry having the similarity degree threshold value and the entries of lower nodes below the child node which are linked with the entry including the similarity degree threshold value, from extraction targets (retrieval results) that satisfy the similarity degree condition regarding the feature value data to be retrieved, on the basis of the result of the comparison. The retrieval processing unit 33 makes the threshold value determination unit 22 calculates the S threshold value from the DS threshold value included in the target entry and the adjustment value whenever the similarity degree threshold value is required. The retrieval processing unit 33 may use a breadth-first search method in which all entries included in the node reached are checked, or may use a depth-first search method in which entries of the child node which is a linkage destination are checked in preference to other entries in the same node.

[Example of Operation]

First, an index generation method in the first exemplary embodiment will be described with reference to FIGS. 5, 6, and 7. As illustrated in the drawings, the index generation method in the first exemplary embodiment is performed by at least one computer such as the retrieval apparatus 1. For example, steps illustrated in the drawings are performed by processing units included in the retrieval apparatus 1. The steps are the same as the processing contents of the above-described processing units included in the retrieval apparatus 1, and thus a description of details of the steps will not be repeated.

Figure 5:
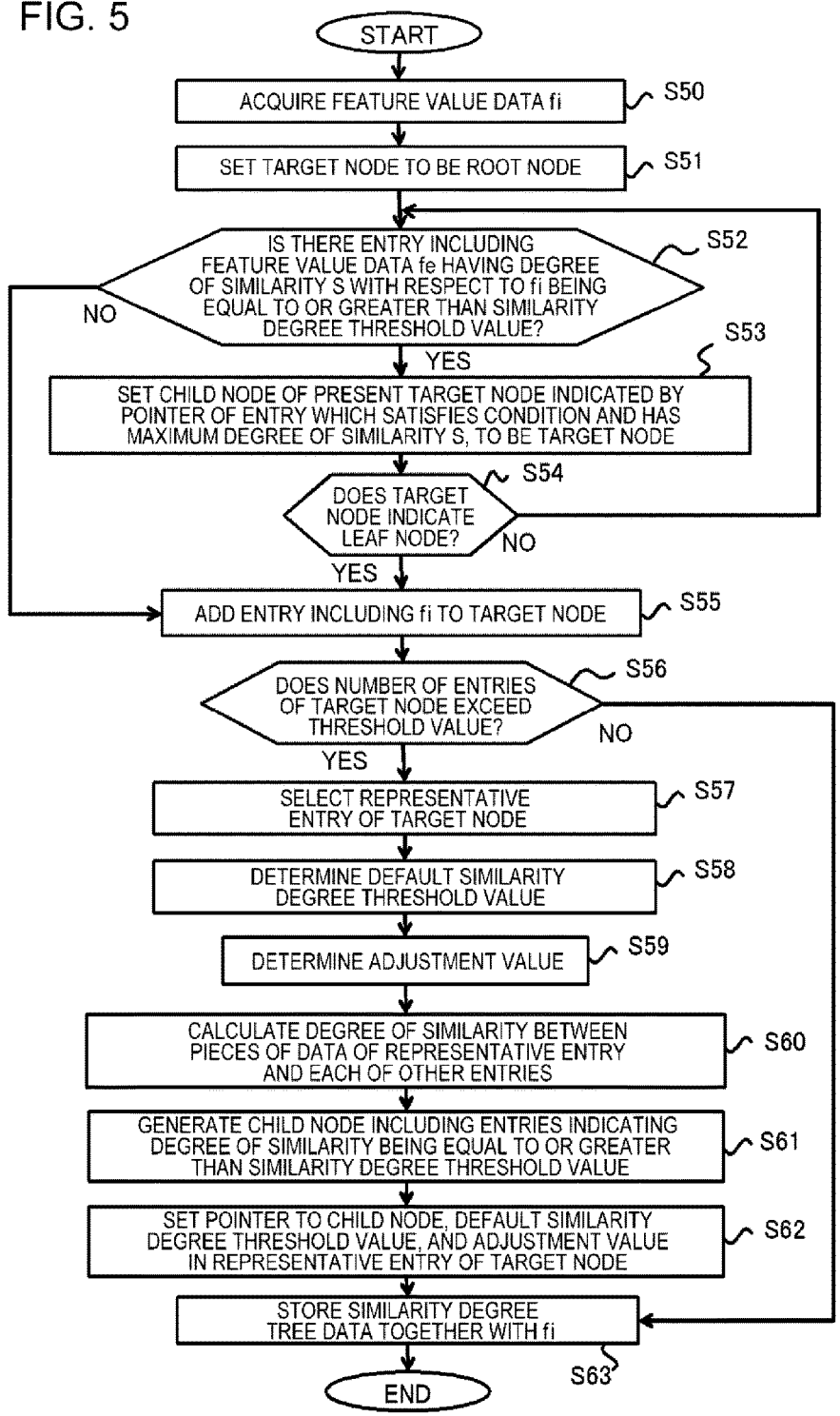
FIG. 5 is a flow chart illustrating an example of the operation of the high-dimensional data retrieval apparatus (retrieval apparatus) related to an index generation process in a case where a first determination method for an adjustment value is used.

FIG. 5 is a flow chart illustrating an example of the operation of the retrieval apparatus 1 related to the index generation process in a case where the first determination method for the adjustment value is used. FIG. 6 is a flow chart illustrating an example of the operation of the retrieval apparatus 1 related to the index generation process in a case where the second determination method for the adjustment value is used. Here, it is assumed that the root node including at least one entry having the pointer to the child node, the DS threshold value, and the adjustment value set therein is generated already. Although not illustrated in FIGS. 5 and 6, the retrieval apparatus 1 already holds various parameters related to the generation of the similarity degree tree before the index generation process is started. The parameters include the entry threshold value, the method of selecting the representative entry, the method of determining the DS threshold value, and the method of determining the adjustment value. The first determination method is selected as the method of determining the adjustment value which is set as a parameter in the example of FIG. 5, and the second determination method is selected in the example of FIG. 6. In addition, the parameters may include the threshold value of a depth of the hierarchy of the similarity degree tree.

«Index Generation Method Using First Determination Method for Adjustment Value»

First, an index generation method in a case where the first determination method for the adjustment value is used will be described with reference to FIG. 5.

The retrieval apparatus 1 acquires feature value data fi which is the index target (S50).

Subsequently, the retrieval apparatus 1 sets the target node to be the root node (S51). The target node means the node which is a candidate for the insertion of the entry indicating the feature value data fi. In this manner, the retrieval apparatus 1 selects candidates for the insertion of the entry from an upper node to a lower node in order.

The retrieval apparatus 1 calculates the degree of similarity S between feature value data fe included in entries, including the pointer to the child node, which are included in the target node and feature value data fi, and specifies the entry including feature value data fe having the degree of similarity S being equal to or greater than the similarity degree threshold value (S52). At this time, the retrieval apparatus 1 determines each similarity degree threshold value by using the DS threshold value and the adjustment value which are included in each entry. In a case where the target node includes the entry including feature value data fe having the degree of similarity S being equal to or greater than the similarity degree threshold value (S52; YES), the retrieval apparatus 1 sets the child node indicated by the pointer of the entry having the maximum degree of similarity S, among the specified entries, to be the target node (S53).

In a case where the target node is not a leaf node (S54; NO), the retrieval apparatus 1 performs the step (S52) and the subsequent steps again. In a case where the target node is a leaf node (S54; YES) or the target node does not include the corresponding entry (S52; NO), the retrieval apparatus 1 adds the entry including the feature value data fi to the target node (S55).

The retrieval apparatus 1 determines whether or not the number of entries of the target node having the entry added thereto exceeds a predetermined entry threshold value (S56). In a case where the number of entries of the target node exceeds the predetermined entry threshold value (S56;

YES), the retrieval apparatus 1 divides the entries included in the target node into the parent node and the child node as follows.

The retrieval apparatus 1 selects the representative entry among the entries of the target node (S57). Here, for example, any one of the above-described two selection methods is used as the method of selecting the representative entry. In addition, a population of entries from which the representative entry is selected may be all entries (including feature value data fi) which are included in the target node, or may be only entries that do not include the pointer to the lower node among all of the entries included in the target node.

The retrieval apparatus 1 determines the DS threshold value to be set in the selected representative entry (S58). A method of determining the DS threshold value is as described above.

Further, the retrieval apparatus 1 determines the adjustment value to be set in the selected representative entry (S59). Here, the retrieval apparatus 1 determines the adjustment value by the above-described first determination method. The above-described first determination method is as described above, that is, the method of determining the adjustment value in accordance with the DS threshold value or another value which is fixedly determined as the position of the hierarchy. The retrieval apparatus 1 may determine the adjustment value in accordance with the DS threshold value, or may determine the adjustment value in accordance with the hierarchical position of the child node obtained by division.

The retrieval apparatus 1 calculates the degree of similarity between feature value data included in the representative entry and each feature value data included in each of entries, other than the representative entry, which are included in the population from which the representative entry is selected (S60).

Subsequently, the retrieval apparatus 1 calculates the S threshold value by subtracting the adjustment value determined in (S59) from the DS threshold value determined in (S58), and generates the child node including the entry having the feature value data indicating the degree of similarity equal to or greater than the calculated S threshold value (S61). At this time, the retrieval apparatus 1 deletes the entry added to the child node from the target node. In addition, in a case where the population of the entries from which the representative entry is selected is all of the entries included in the target node and the selected representative entry already has the pointer to the child node, the retrieval apparatus 1 may add the entry having the feature value data indicating the degree of similarity equal to or greater than the similarity degree threshold value to an existing child node without newly generating the child node.

The retrieval apparatus 1 sets the pointer to the child node generated in (S61), the DS threshold value determined in (S58), and the adjustment value determined in (S59) in the representative entry of the target node (S62). The retrieval apparatus 1 may set the S threshold value which is calculated from the DS threshold value and the adjustment value in the representative entry, instead of setting the DS threshold value and the adjustment value or together with the values.

In a case where the number of entries of the target node does not exceed the predetermined entry threshold value (S56; NO) or after (S62) is completed, the retrieval apparatus 1 stores pieces of similarity degree tree data in the database 35 together with the feature value data fi (S63). Here, the retrieval apparatus 1 may reflect only data at updated locations among the pieces of similarity degree tree data on the database 35. In addition, the retrieval apparatus 1 substitutes feature value data fi which is set in the entry of the leaf node of the similarity degree tree for the pointer to the feature value data fi stored in the database 35 before the pieces of similarity degree tree data are stored.

«Index Generation Method Using Second Determination Method for Adjustment Value»

Next, an index generation method in a case where the second determination method for the adjustment value is used will be described with reference to FIG. 6. In FIG. 6, steps having the same contents as those in FIG. 5 are denoted by the same reference numerals and signs as those in FIG. 5.

The retrieval apparatus 1 performs (S50) to (S56), similar to the case of FIG. 5.

In a case where the number of entries of the target node exceeds the predetermined entry threshold value (S56; YES), the retrieval apparatus 1 divides the entries included in the target node into the parent node and the child node as follows. The retrieval apparatus 1 performs (S57) and (S58), similar to the case of FIG. 5. Subsequently, the retrieval apparatus 1 performs (S60), similar to the case of FIG. 5, without performing (S59) illustrated in FIG. 5, that is, without determining the adjustment value.

Subsequently, the retrieval apparatus 1 generates the child node including the entry having the feature value data indicating the degree of similarity being equal to or greater than the DS threshold value, which is determined in (S58), (S70). Here, (S70) is different from (S61) illustrated in FIG. 5 only in that not the S threshold value but the DS threshold value is used.

Next, the retrieval apparatus 1 determines the adjustment value to be set in the selected representative entry (S71). Here, the retrieval apparatus 1 determines the adjustment value by the above-described second determination method. The above-described second determination method is as described above, that is, is a method of determining the adjustment value in accordance with a data group indicated by the child node. The retrieval apparatus 1 determines the adjustment value in accordance with the degree of dispersion of degrees of similarity between representative feature value data and each of pieces of feature value data indicated by entries selected to be included in the child node by using the DS threshold value.

Hereinafter, the retrieval apparatus 1 performs (S62) and (S63), similar to the case of FIG. 5.

On the other hand, in a case where the number of entries of the target node does not exceed the predetermined entry threshold value (S56; NO), the retrieval apparatus 1 operates as follows.

The retrieval apparatus 1 determines a temporary adjustment value for the representative entry indicating representative feature value data in accordance with the degree of dispersion of degrees of similarity between the representative feature value data and each of pieces of feature value data indicated by all entries, included in the target node, which include feature value data fi (S72). At this time, the DS threshold value and the adjustment value are set already in the representative entry. The retrieval apparatus 1 subtracts the temporary adjustment value from the DS threshold value which is already set in the representative entry to thereby determine a temporary S threshold value (S73).

The retrieval apparatus 1 determines whether or not the degree of similarity between the feature value data fi and the representative feature value data is equal to or greater than the temporary S threshold value (S74). In a case where the degree of similarity is equal to or greater than the temporary S threshold value (S74; YES), the retrieval apparatus 1 updates the adjustment value which is already set in the representative entry to the temporary adjustment value, which is determined in (S72), (S75). In other words, the retrieval apparatus 1 substitutes the adjustment value which is already set in the representative entry for the temporary adjustment value (S75).

In a case where the degree of similarity is less than the temporary S threshold value (S74; NO), the retrieval apparatus 1 deletes the entry including feature value data fi from the target node (S76). This is because the relationship breaks in which the representative entry of the upper node and the entry included in the lower node having the link relationship with the representative entry indicate the feature value data equal to or greater than the similarity degree threshold value. Thereby, the retrieval apparatus 1 selects the target node again in (S52) and the subsequent step.

Figure 7:
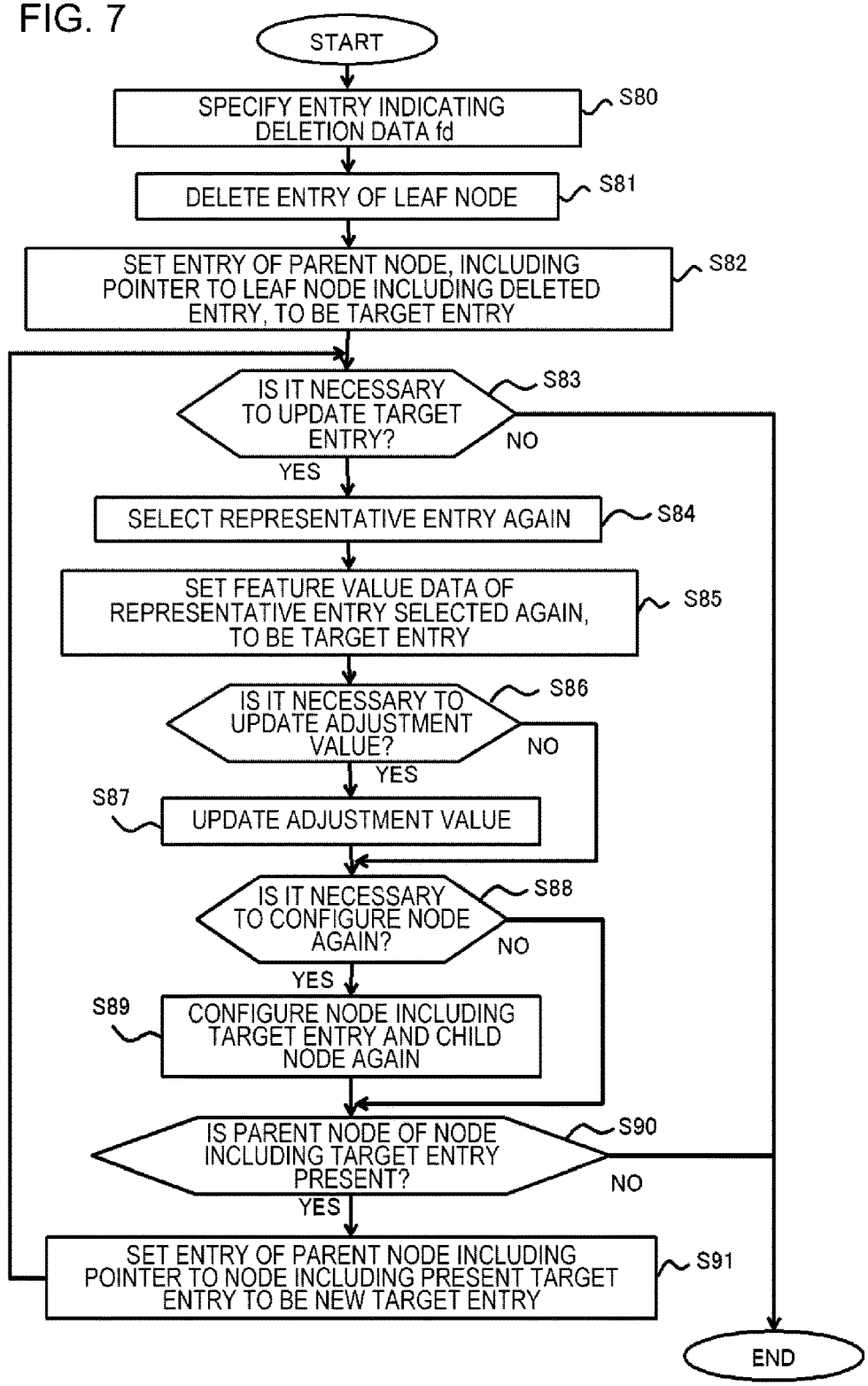
FIG. 7 is a flow chart illustrating an example of the operation of the high-dimensional data retrieval apparatus (retrieval apparatus) related to a data deletion process.

FIG. 7 is a flow chart illustrating an example of the operation of the retrieval apparatus 1 related to a data deletion process.

When the retrieval apparatus 1 acquires feature value data fd to be deleted (hereinafter, referred to as deletion data), the retrieval apparatus specifies the entry indicating the deletion data fd (S80). At this time, the retrieval apparatus 1 acquires feature value data indicated by each entry of the leaf node from the database 35 by using the pointer included in the entry. A method of specifying deletion data fd may be the same as the similarity retrieval method to be described later with reference to FIG. 8, and thus a description thereof will not be repeated. However, in this case, the similarity degree condition δ is set to 1 (consistency).

The retrieval apparatus 1 deletes the entry of the leaf node among the specified entries (S81). In a case where deletion data fd is set to be a representative of a certain data set, the specified entries also include the intermediate node. In addition, the retrieval apparatus 1 may delete the deletion data fd from the database 35.

Subsequently, the retrieval apparatus 1 sets the entry of the parent node, including the pointer to the leaf node including the deleted entry, to be the target entry (S82).

The retrieval apparatus 1 determines whether or not it is necessary to update the target entry (S83). For example, in a case where the target entry includes deletion data fd, a case where the method of selecting the representative entry which is performed in (S57) described above depends on the distribution of values of a set of pieces of feature value data indicated by the child node, or a case where the second determination method for the adjustment value is used, the retrieval apparatus 1 determines that it is necessary to update the target entry (S83; YES).

On the other hand, in a case where a method of selecting the representative entry is a method of selecting any entry and the target entry does not include deletion data fd, the retrieval apparatus 1 determines that it is not necessary to update the target entry (S83; NO). When it is determined that it is not necessary to update the target entry (S83; NO), the retrieval apparatus 1 terminates the data deletion process.

When the retrieval apparatus 1 determines that it is necessary to update the target entry (S83; YES), the retrieval apparatus selects the representative entry again (S84). The population from which a representative entry is selected includes, for example, entries included in the child node of the target entry. However, other entries of the node including the target entry may be further added to the population.

The retrieval apparatus 1 updates the original feature value data included in the target entry to the feature value data of the representative entry (S85).

The retrieval apparatus 1 further determines whether or not it is necessary to update the adjustment value which is set in the target entry (S86). In a case where the second determination method for the adjustment value is used, the retrieval apparatus 1 determines that it is necessary to update the adjustment value (S86; YES). In a case where it is necessary to update the adjustment value (S86; YES), the retrieval apparatus 1 updates the adjustment value which is set in the target entry by the second determination method for the adjustment value (S87). Specifically, the retrieval apparatus 1 determines the adjustment value in accordance with the degree of dispersion of degrees of similarity between the feature value data indicated by the representative entry which is selected again and the feature value data indicated by the leaf node including the deleted entry (S87). However, in a case where the first determination method for the adjustment value is used, the retrieval apparatus 1 determines that it is not necessary to update the adjustment value (S86; NO).

The retrieval apparatus 1 determines whether or not it is necessary to configure again the node including the target entry and the present child node of the target entry (S88). Specifically, the retrieval apparatus 1 acquires the degree of similarity between the feature value data and the target entry and each of pieces of feature value data of other entries of the same node, and further calculates the S threshold value from the DS threshold value and the adjustment value which are set in the target entry. The retrieval apparatus 1 compares each of the acquired degrees of similarity with the calculated S threshold value to thereby determine whether to move the other entries included in the target node to the present child node. For example, it is determined that the entry indicating the degree of similarity being equal to or greater than the similarity degree threshold value has to be moved to the child node.

The retrieval apparatus 1 moves the other entries of the node including the target entry to the child node to thereby configure the node including the target entry and the child node of the target entry again (S89).

Subsequently, the retrieval apparatus 1 determines whether or not the parent node of the node including the target entry is present (S90). Specifically, the retrieval apparatus 1 determines whether or not the intermediate node having the entry including the pointer to the node including the target entry is present.

In a case where the parent node of the node including the target entry is present (S90; YES), the retrieval apparatus 1 sets the entry of the parent node including the pointer to the node including the present target entry to be the new target entry (S91). The retrieval apparatus 1 performs step (S83) and the subsequent steps on the new target entry. Here, the retrieval apparatus 1 reflects data at updated locations among the pieces of similarity degree tree data on the database 35.

Figure 8:
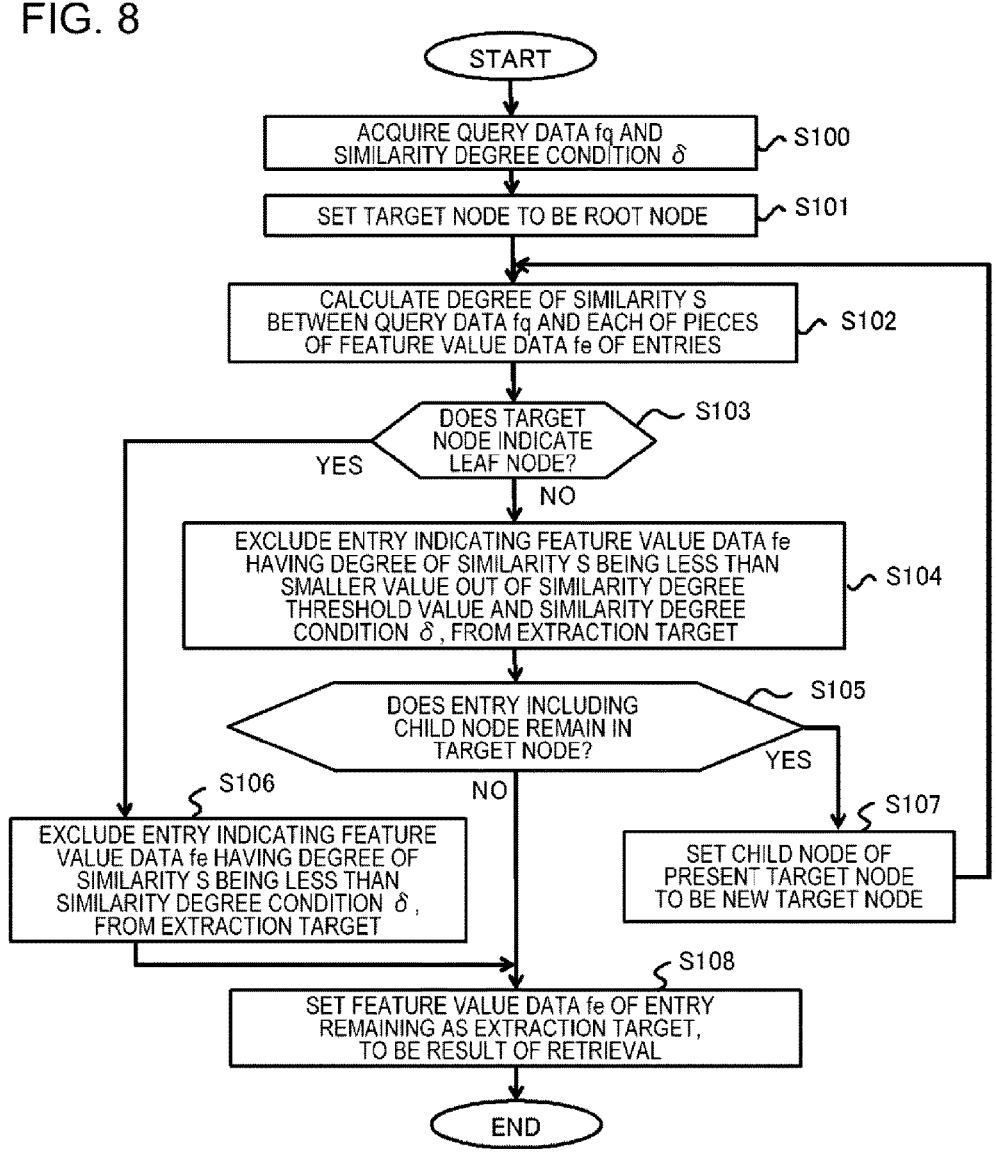
FIG. 8 is a flow chart illustrating an example of the operation of the high-dimensional data retrieval apparatus (retrieval apparatus) related to a similarity retrieval process.

Next, a similarity retrieval method in the first exemplary embodiment will be described with reference to FIG. 8. FIG. 8 is a flow chart illustrating an example of the operation of the retrieval apparatus 1 related to a similarity retrieval process.

The retrieval apparatus 1 acquires the feature value data to be retrieved (hereinafter, referred to as query data fq) and the similarity degree condition δ (S100). Regarding the data acquired herein, the feature value data having the degree of similarity being equal to or greater than the similarity degree condition δ with respect to the query data fq is required to be extracted from the database 35.

The retrieval apparatus 1 sets the target node to be the root node (S101). The target node means the node which is a candidate for comparison with the query data fq. In this manner, the retrieval apparatus 1 selects candidates for comparison from an upper node to a lower node in order.

The retrieval apparatus 1 calculates the degree of similarity S between the query data fq and each of pieces of feature value data fe of entries of the target node (S102).

In a case where the target node is a leaf node (S103; YES), the retrieval apparatus 1 excludes the entry indicating feature value data fe having the degree of similarity δ being less than the similarity degree condition δ, among the entries included in the target node, from an extraction target (S106).

On the other hand, in a case where the target node is not a leaf node (S103; NO), the retrieval apparatus 1 excludes the entry indicating feature value data fe having the degree of similarity S being less than a smaller value out of the similarity degree threshold value and the similarity degree condition δ, among the entries included in the target node, from an extraction target (S104). At this time, the retrieval apparatus 1 calculates the similarity degree threshold value for each entry by using the DS threshold value and the adjustment value which are set in each entry.

The retrieval apparatus 1 determines whether or not the entry including the child node remains in the target node without being excluded (S105). In a case where the entry including the child node remains (S105; YES), the retrieval apparatus 1 sets the child node of the present target node to be the new target node (S107). The retrieval apparatus 1 performs step (S102) and the subsequent steps on the new target node.

The retrieval apparatus 1 sets the feature value data fe of the entry remaining as the extraction target, to be the result of retrieval (S108).

The above-described similarity retrieval method is a method using the breadth-first search method, but the depth-first search method may be used. In the similarity retrieval method using the depth-first search method, in a case where the target node is the intermediate node, the degree of similarity S between feature value data fe of one entry of the target node and query data fq is calculated in (S102). Further, after step (S104) is performed, the uppermost intermediate node having the entry having not been subjected to comparison with the query data fq is set to be the new target node, and step (S102) and the subsequent steps are performed.

The index generation method and the similarity retrieval method in the present exemplary embodiment are not limited to the examples illustrated in FIGS. 5, 6, 7, and 8. For example, in the examples of FIGS. 5 and 6, the feature value data fi and the similarity degree tree data are stored in the database 35 whenever the feature value data fi is acquired, but a timing when the feature value data fi and the similarity degree tree data are stored in the database 35 is arbitrary. In addition, in a step of calculating the degree of similarity such as (S60), the degree of similarity which was calculated in the past may be acquired from a holding unit, rather than calculating the degree of similarity every time. In addition, in the example of FIG. 7, in addition to the necessity of updating the adjustment value, the necessity of updating the DS threshold value may further be determined.

[Advantageous Effect of First Exemplary Embodiment]

As described above, in the first exemplary embodiment, the default similarity degree threshold value and the adjustment value are determined with respect to the link relationship between the representative entry of the upper node and the lower node, and are included in the representative entry.

In addition, the feature value data disposed in the lower node having the link relationship is determined on the basis of the similarity degree threshold value obtained by subtracting the adjustment value from the default similarity degree threshold value. This is embodiment of a technical idea in which the similarity degree tree is constructed using a value, obtained by alleviating a certain threshold value regarding a degree of similarity by the adjustment value, as a final threshold value. Thereby, it is possible to make a set of pieces of similar data likely to be collected in one node. According to the first exemplary embodiment, it is possible to obtain the same effects as those in the above-described exemplary embodiment by making a set of pieces of similar data likely to be collected in one node.

Here, in the first determination method for the adjustment value, the adjustment value is determined to become smaller as the default similarity degree threshold value becomes larger. That is, a relatively small default similarity degree threshold value is alleviated to be relatively large, and a relatively large default similarity degree threshold value is alleviated to be relatively small.

On the other hand, in the second determination method for the adjustment value, the adjustment value is determined to become smaller as the degree of dispersion of a group of the degrees of similarity between representative feature value data and each of pieces of feature value data becomes smaller. There is a high possibility that a set of pieces of feature value data for which the degree of dispersion of a group of the degrees of similarity is relatively low is collected by a relatively large similarity degree threshold value. In contrast, there is a high possibility that a set of pieces of feature value data for which the degree of dispersion of a group of the degrees of similarity is relatively high is collected by a relatively small similarity degree threshold value. This is equivalent to the fact that the adjustment value is determined to become smaller as the similarity degree threshold value which is finally used becomes larger. Accordingly, the same conclusion as that in the first determination method is also obtained in the second determination method. Such a conclusion has the same contents as those in the above-described exemplary embodiment, and thus it is possible to obtain the same effects as those in the above-described exemplary embodiment.

In addition, in the first exemplary embodiment, nodes are checked in order from an upper hierarchy to a lower hierarchy on the basis of the degrees of similarity with respect to pieces of feature value data of nodes, and thus the entry corresponding to the acquired feature value data which is the index target is inserted into an appropriate node. Further, the nodes are hierarchically divided in accordance with the number of entries of the nodes. Therefore, according to the first exemplary embodiment, it is possible to dynamically generate and update the similarity degree tree on the basis of data which is the index target, regardless of the scale of the data which is the index target. On the other hand, the technique proposed in the background of the invention less supports dynamic generation and updating of the index. Even an existing technique, such as an R-tree technique, which supports dynamic generation and updating of the index is not likely to cope with large-scale data.

In addition, in the first exemplary embodiment, the above-described two selection methods have been described as a method of selecting the representative entry during the overflow adjustment of the node, or the like. Further, a plurality of methods of determining the default similarity degree threshold value have been described. The representative entry and the default similarity degree threshold value are determined in consideration of an existing entry by the plurality of methods, and thus it is possible to easily balance the number of entries of the similarity degree tree.

[Second Exemplary Embodiment]

In the above-described first exemplary embodiment, the entry including the pointer to the child node includes one piece of feature value data which is a representative of a set of pieces of feature value data indicated by the child node. In the second exemplary embodiment, a plurality of the representative feature value data are included in the entry together with the pointer to the child node. The upper limit of the number of the representative feature value data is set to, for example, a value smaller than the number of pieces of the feature value data indicated by the child node. Hereinafter, the retrieval apparatus 1 in the second exemplary embodiment will be described focusing on contents different from those of the first exemplary embodiment. In the following description, the same contents as those of the first exemplary embodiment will not be repeated.

Figure 9:
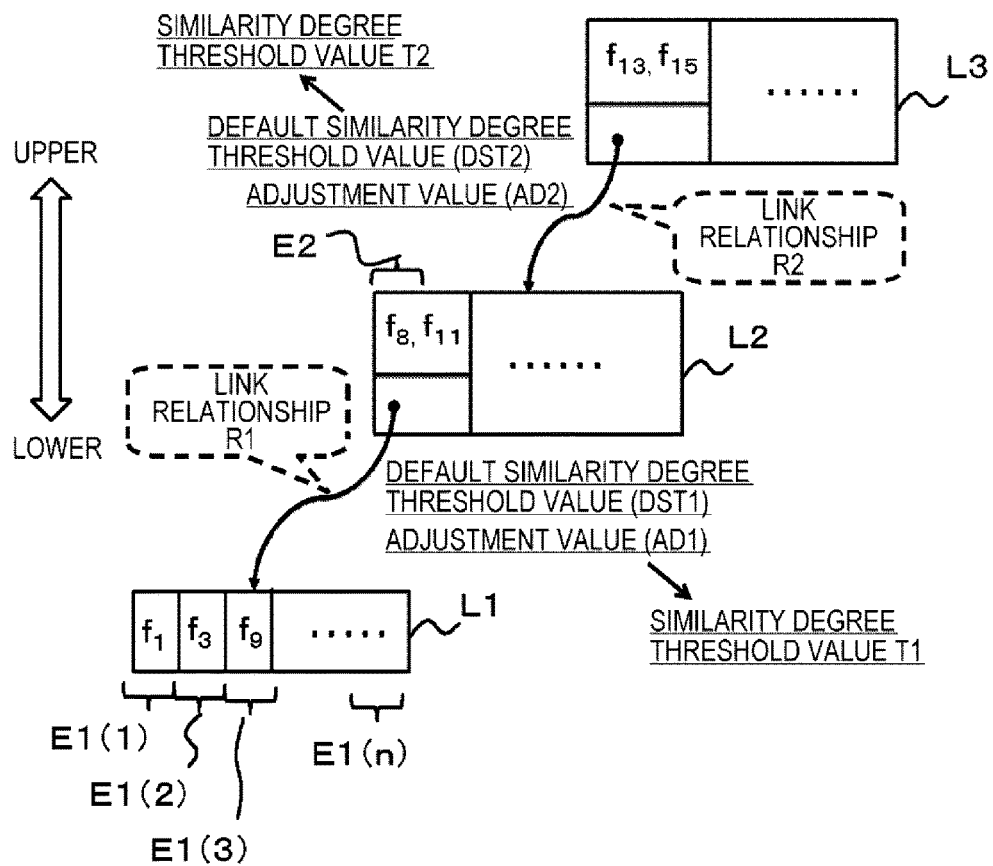
FIG. 9 is a schematic diagram illustrating an example of a portion of an index in a second exemplary embodiment.

FIG. 9 is a schematic diagram illustrating an example of a portion of the index in the second exemplary embodiment. As illustrated in FIG. 9, in the second exemplary embodiment, an entry E2 of an upper (intermediate) node L2 including a pointer (link relationship R1) to a lower node L1 includes a default similarity degree threshold value DST1 and an adjustment value AD1, and includes a plurality of pieces of feature value data f8 and f11 which are representatives of a plurality of pieces of feature value data (f1, f3, f9, and the like) indicated by a plurality of entries E1($n$) included in the lower node L1.

The representative selection unit 23 selects a plurality of pieces of the representative feature value data among a plurality of pieces of the feature value data included in a certain node during the addition or deletion of the feature value data, if necessary. In the intermediate node, the entry including a plurality of pieces of the feature value data and the pointer to the child node and the entry that does not include the pointer to the child node and includes one piece of feature value data may be jointly present. In this case, the representative selection unit 23 may select a plurality of the representative feature value data from the entry that does not include the pointer to the child node. In addition, the representative selection unit 23 may select a plurality of the representative feature value data among all the feature value data of all entries included in the intermediate node.

For example, the representative selection unit 23 selects a plurality of the representative feature value data by using any one of the following two selection methods. However, in the present exemplary embodiment, a method of selecting a plurality of the representative feature value data is not limited to the following method. The representative selection unit 23 may randomly select a plurality of the representative feature value data.

In a first selection method, the representative selection unit 23 selects a combination of pieces of the feature value data for which the degree of similarity therebetween has the maximum value, as a representative. In a case where two pieces of feature value data are selected as representatives, the representative selection unit 23 selects a pair of pieces of feature value data for which a degree of similarity therebetween has a maximum value, as representatives.

In a second selection method, the representative selection unit 23 selects a combination of pieces of the feature value data for which the degree of similarity therebetween has the minimum value, as a representative. In a case where two pieces of feature value data are selected as representatives, the representative selection unit 23 selects a pair of pieces of the feature value data for which the degree of similarity therebetween has the minimum value, as representatives.

The threshold value determination unit 22 can determine the DS threshold value by using the following method, in addition to the method described in the first exemplary embodiment. The threshold value determination unit 22 determines the degree of similarity between the feature value data which is a center point of a plurality of the representative feature value data and each of the other pieces of feature value data, to be the DS threshold value.

In a case where an index generation unit 21 reflects new feature value data on the similarity degree tree, the index generation unit acquires the degree of similarity between the new feature value data and each of a plurality of the feature value data indicated by entries of the intermediate node including the pointer to the lower node, compares each of the degrees of similarity with the similarity degree threshold value, and determines the insertion destination of the entry including the new feature value data to be the intermediate node or the lower node on the basis of the results of the comparisons. Specifically, the index generation unit 21 determines the insertion destination of the entry including the new feature value data to be the lower node when all of the degrees of similarity are equal to or greater than the similarity degree threshold value, and determines the insertion destination of the entry including the target feature value data to be the intermediate node when even one degree of similarity is less than the similarity degree threshold value. However, the index generation unit 21 may determine the insertion destination of the entry including the new feature value data to be the lower node when even one degree of similarity is equal to or greater than the similarity degree threshold value, and may determine the insertion destination of the entry including the target feature value data to be the intermediate node when all of the degrees of similarity are less than the similarity degree threshold value.

The retrieval processing unit 33 compares the degrees of similarity which are acquired with respect to the feature value data to be retrieved and a plurality of the feature value data included in the entry, with the similarity degree threshold value or the similarity degree condition acquired by the condition acquisition unit 31, and excludes the entry including the DS threshold value and the adjustment value which correspond to the similarity degree threshold value and the entry of lower nodes below the child node linked with the entry, from the extraction targets (retrieval results) that satisfy the similarity degree condition with respect to the feature value data to be retrieved. At this time, when all of the degrees of similarity are less than a smaller value out of the similarity degree threshold value and the similarity degree condition, the entry including the DS threshold value and the adjustment value which correspond to the similarity degree threshold value is excluded from the extraction target.

[Example of Operation]

Hereinafter, an index generation method in the second exemplary embodiment will be described with reference to FIGS. 5, 6, and 7. The second exemplary embodiment is different from the first exemplary embodiment in that a plurality of the feature value data are set to be targets to be processed in (S52), (S53), (S57), (S60), (S61), (S62), and (S70).

Specifically, in (S52), the retrieval apparatus 1 calculates the degree of similarity S between the feature value data fi and each of a plurality of the feature value data fe which are included in each of entries included in the target node, and specifies the entry indicating a plurality of the feature value data fe having a plurality of the degrees of similarity S being equal to or greater than the similarity degree threshold value. However, the retrieval apparatus 1 may specify the entry indicating a plurality of the feature value data fe including one piece of feature value data having the degree of similarity S being equal to or greater than the similarity degree threshold value. In (S53), the retrieval apparatus 1 sets the child node indicated by the pointer of the entry having the maximum degree of similarity S, among the specified entries, to be the target node.

Specifically, in (S57), the retrieval apparatus 1 selects a plurality of the feature value data as representatives among entries of the target node. In (S60), the retrieval apparatus 1 calculates the degree of similarity between each of the plurality of the feature value data selected as representatives in (S57) and each of the feature value data other than the representatives included in a population from which the representatives are selected. In (S61) and (S70), the retrieval apparatus 1 generates the child node including the entry including the feature value data having the degree of similarity with respect to each of the plurality of the feature value data, selected as representatives, being equal to or greater than the similarity degree threshold value. However, the retrieval apparatus 1 may include the entry including the feature value data having the degree of similarity with respect to one of the plurality of the feature value data, selected as representatives, being equal to or greater than the similarity degree threshold value, in the child node.

In (S62), the retrieval apparatus 1 generates one entry including the plurality of the feature value data selected as representatives, deletes the entry including the representatives, and sets pointers to the child nodes generated in (S61) and (S70), the DS threshold value, and the adjustment value in the generated entry.

The second exemplary embodiment is different from the first exemplary embodiment in that a plurality of the feature value data are set to be targets to be processed in (S84), (S85), and (S88).

In (S84), the retrieval apparatus 1 selects a plurality of the representative feature value data again.

In (S85), the retrieval apparatus 1 sets the plurality of the feature value data selected again in the target entry.

In (S88), the retrieval apparatus 1 compares each of degrees of similarity between each of a plurality of the feature value data of the target entry and each of the feature value data of other entries of the same node with a similarity degree threshold value calculated from the DS threshold value and the adjustment value which are set in the target entry, to thereby determine whether to move the other entries included in the target node to the present child node. For example, it is determined that the entry including pieces of the feature value data having the degree of similarity with respect to each of the plurality of the feature value data of the target entry being equal to or greater than the similarity degree threshold value has to be moved to the child node. However, it may be determined that the entry including feature value data having the degree of similarity with respect to one of the plurality of the feature value data of the target entry being equal to or greater than the similarity degree threshold value is moved to the child node.

Next, a similarity retrieval method in the second exemplary embodiment will be described with reference to FIG. 8. The second exemplary embodiment is different from the first exemplary embodiment in that a plurality of the feature value data are set to be targets to be processed in (S102) and (S104).

In a case where the target node is the intermediate node, the retrieval apparatus 1 calculates the degree of similarity S between query data fq and each of a plurality of the feature value data fe of entries of the target node in (S102). In (S104), the retrieval apparatus 1 excludes the entry indicating a plurality of the feature value data fe having a plurality of the degrees of similarity S being less than a smaller value out of the similarity degree threshold value and the similarity degree condition δ, among the entries included in the target node, from the extraction target.

[Advantageous Effect of Second Exemplary Embodiment]

In the second exemplary embodiment, entries of the intermediate node including the pointer to the child node indicate a plurality of the feature value data. That is, in the second exemplary embodiment, a plurality of the representative feature value data of a set of the feature value data indicated by the child node are selected, and the plurality of the feature value data are set in entries of the parent node. In the set of the feature value data indicated by the child node, the degree of similarity with each of all the feature value data included in the entries of the parent node or with anyone piece of feature value data is equal to or greater than a similarity degree threshold value.

In this manner, according to the second exemplary embodiment, a plurality of the feature value data indicated by entries of the parent node are used, and thus the degree of similarity with a set of the feature value data indicated by the child node is determined. Accordingly, the similarity degree range of the data set indicated by the child node can be defined more strictly than that in the first exemplary embodiment by the entries of the parent node.

In addition, according to a method of selecting a plurality of entries, indicating a combination of pieces of feature value data for which the degree of similarity therebetween has the maximum value, as a plurality of the representative entries, even when the dispersion of the plurality of the feature value data indicated by the plurality of entries is large, the similarity degree range of the data set indicated by the child node can be strictly defined by the entries of the parent node. On the other hand, according to a method of selecting a plurality of the entries, indicating a combination of pieces of the feature value data for which the degree of similarity therebetween has the minimum value, as a plurality of the representative entries, even when the plurality of the feature value data indicated by the plurality of entries aggregate densely, the similarity degree range of the data set indicated by the child node can be strictly defined by the entries of the parent node.

In this manner, the similarity degree range of the data set indicated by the child node can be strictly defined by the entries of the parent node. Therefore, according to the second exemplary embodiment, it is possible to easily balance the similarity degree tree and to improve the efficiency of retrieval.

[Third Exemplary Embodiment]

In a third exemplary embodiment, an entry threshold value indicating entry capacity of each node is dynamically determined for each node. The third exemplary embodiment described below is configured such that new features are added to the above-described first exemplary embodiment. Hereinafter, a retrieval apparatus 1 in the third exemplary embodiment will be described focusing on contents different from those in the above-described exemplary embodiments. In the following description, the same contents as those in the above-described exemplary embodiments will not be repeated.

Figure 10:
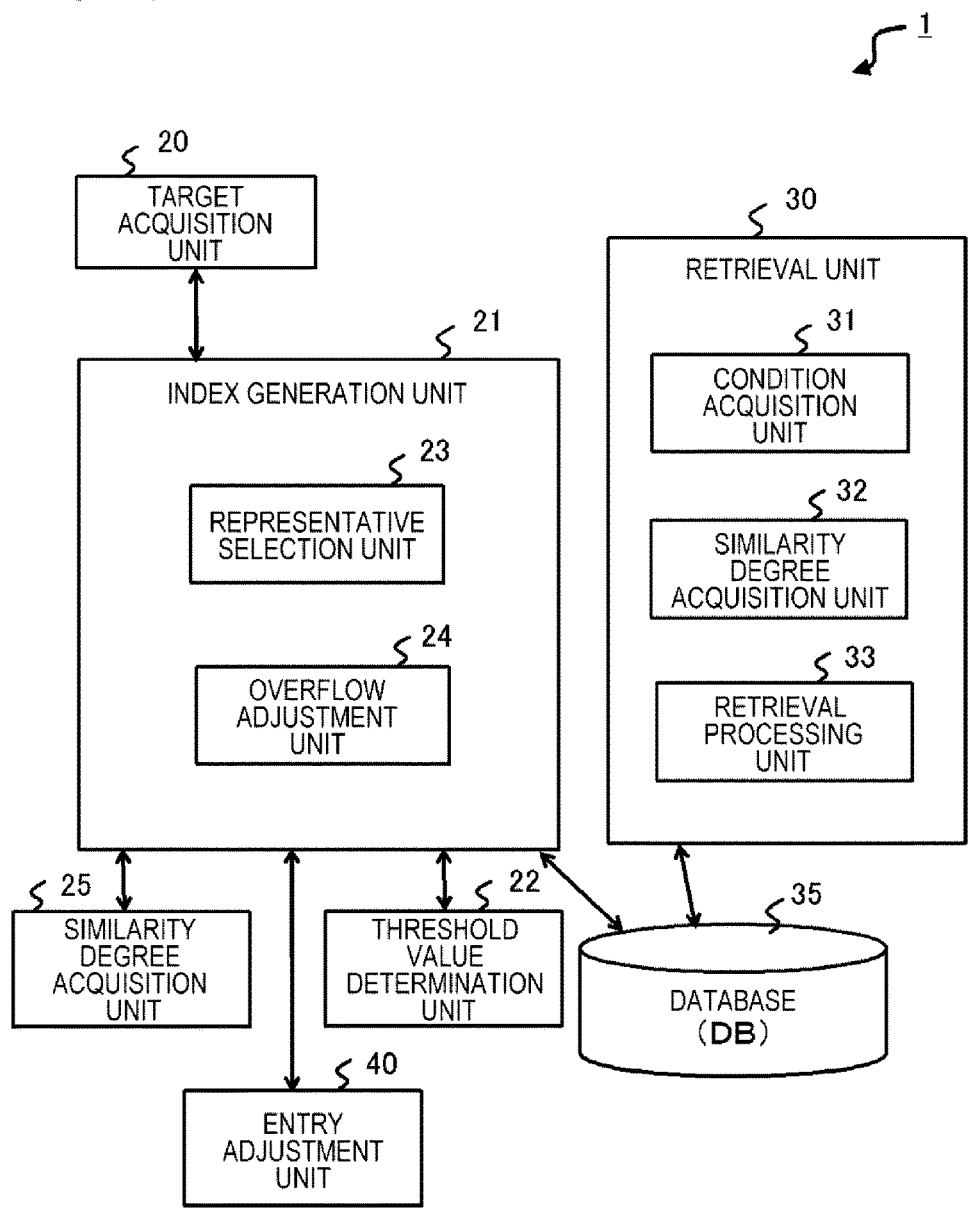
FIG. 10 is a schematic diagram illustrating an example of a processing configuration of the high-dimensional data retrieval apparatus (retrieval apparatus) in a third exemplary embodiment.

FIG. 10 is a schematic diagram illustrating an example of a processing configuration of the retrieval apparatus 1 in the third exemplary embodiment. As shown in FIG. 10, the retrieval apparatus 1 in the third exemplary embodiment further includes an entry adjustment unit 40, in addition to the components of the above-described exemplary embodiments. The entry adjustment unit 40 is realized in the same manner as other processing units.

The database 35 further stores the entry threshold values for respective nodes, as information regarding the similarity degree tree.

The entry adjustment unit 40 determines the entry threshold value indicating the maximum number of entries within the node, with respect to a plurality of the nodes. Specifically, in a case where the insertion destination of the entry indicating the index target data is determined to be a certain node by the index generation unit 21, the entry adjustment unit 40 determines whether to change the entry threshold value regarding the node, on the basis of a distribution state of a group of degrees of similarity between the representative feature value data indicated by the representative entry (upper node) among a plurality of entries included in the node and each of a plurality of the feature value data indicated by the plurality of entries and the index target data. The distribution state of the group of degrees of similarity is expressed by, for example, the uniformity of distribution, the degree of dispersion, the presence or absence of an abnormal value, and the like. For example, the entry adjustment unit 40 performs the detection of the abnormal value with respect to the group of degrees of similarity, increments the entry threshold value in a case where the abnormal value is not detected, and does not change the entry threshold value in a case where the abnormal value is detected. Various well-known methods based on various indexes, such as statistics and a distance, are used as a method of detecting the abnormal value, and thus a well-known method of detecting the abnormal value may also be used in the entry adjustment unit 40.

In this manner, the entry adjustment unit 40 flexibly changes the entry capacity of each node so that pieces of the feature value data close to each other are indicated by one node as much as possible. The entry adjustment unit 40 may determine the entry threshold value to be any initial value at a point in time when the node is generated, and may increment the entry threshold value.

It is desired that the entry adjustment unit 40 determines whether or not the number of entries in the node determined to be the insertion destination of the entry exceeds the entry threshold value of the node in a case where the entry is inserted into the node, and performs the above-mentioned determination in a case where the number of entries exceeds the entry threshold value. This is because the above-mentioned determination is based on a distribution state of a group of degrees of similarity, thereby requiring the number of pieces of data to a certain extent. In addition, this is because the above-mentioned determination can be limited to being performed only during overflow adjustment, thereby allowing the speed-up of the entire process to be achieved.

[Example of Operation]

Figure 11:
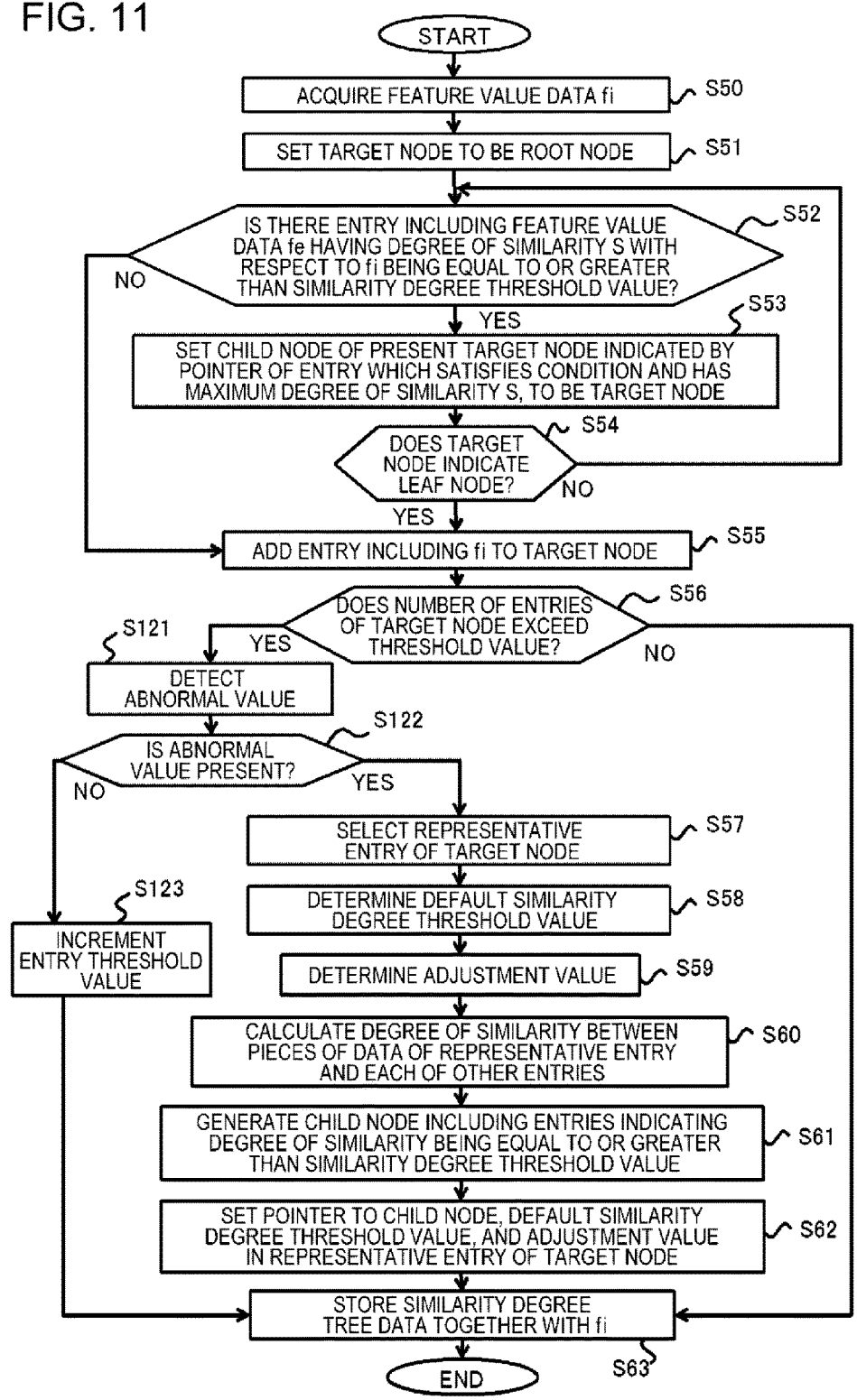
FIG. 11 is a flow chart illustrating an example of the operation of the high-dimensional data retrieval apparatus (retrieval apparatus) in the third exemplary embodiment related to an index generation process in a case where a first determination method for an adjustment value is used.

Hereinafter, an index generation method in the third exemplary embodiment will be described with reference to FIG. 11. FIG. 11 is a flow chart illustrating an example of the operation of the retrieval apparatus 1 in the third exemplary embodiment related to an index generation process in a case where the first determination method for the adjustment value is used. In FIG. 11, steps having the same contents as those in FIG. 5 are denoted by the same reference numerals and signs as those in FIG. 5.

The retrieval apparatus 1 performs (S50) to (S56), similar to the case of FIG. 5. However, in (S56), the entry threshold value stored in the database 35 with respect to the target node is used. In a case where the number of entries of the target node exceeds the entry threshold value of the target node (S56; YES), the retrieval apparatus 1 performs the detection of the abnormal value on a group of degrees of similarity between each feature value data (including fi) indicated by the entries of the target node and the representative feature value data thereof (S121).

In a case where the abnormal value is detected by the detection of the abnormal value, which is performed in (S121), (S122; YES), the retrieval apparatus 1 performs step (S57) and the subsequent steps similar to FIG. 5, and divides the entries included in the target node into the parent node and the child node. On the other hand, in a case where the abnormal value has not been detected (S122; NO), the retrieval apparatus 1 increments the entry threshold value of the target node (S123). The entry threshold value is incremented by 1. The retrieval apparatus 1 updates the entry threshold value stored in the database 35 with respect to the target node to the incremented entry threshold value (S63).

Figure 6:
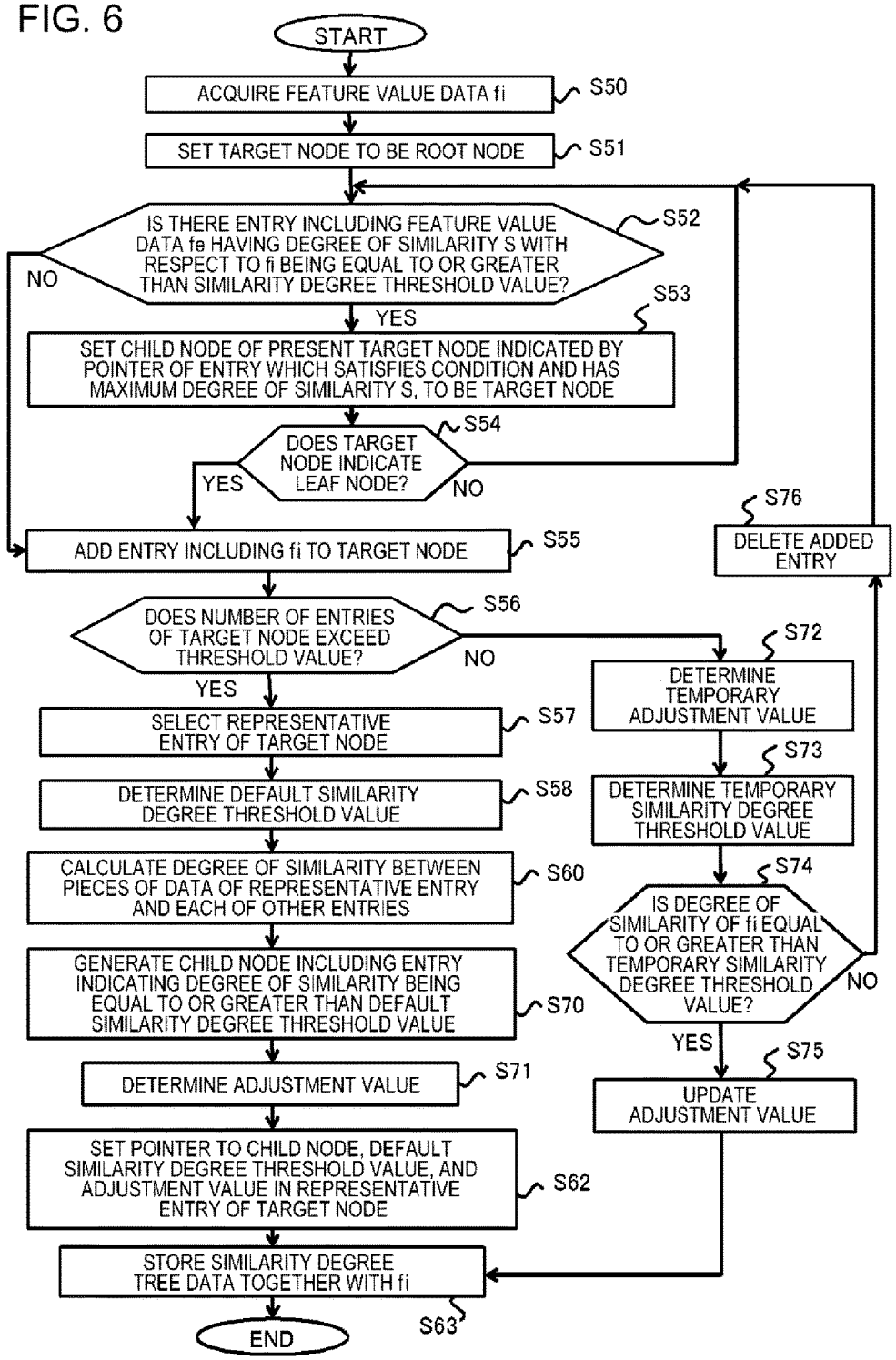
FIG. 6 is a flow chart illustrating an example of the operation of the high-dimensional data retrieval apparatus (retrieval apparatus) related to an index generation process in a case where a second determination method for an adjustment value is used.

Although the index generation method in a case where the second determination method for the adjustment value is not illustrated in the drawing, the steps in FIG. 11 which are added from FIG. 5 may be added to FIG. 6 for the same purport. That is, in a case where the second determination method for the adjustment value is used, (S121), (S122), and (S123) illustrated in FIG. 11 are added between (S56) and (S57) of FIG. 6.

The retrieval apparatus 1 may operate during the deletion of data, similar to FIG. 7. Although not shown in the drawing, the retrieval apparatus 1 may determine whether or not it is necessary to update the entry threshold value of the leaf node including the deleted entry. In this case, the retrieval apparatus 1 determines whether or not the entry threshold value of the leaf node including the deleted entry has been incremented from an initial value, and decrements the entry threshold value by 1 in a case where the entry threshold value is larger than the initial value.

[Advantageous Effects in Third Exemplary Embodiment]

In the third exemplary embodiment, the entry threshold value indicating the maximum number of entries for each node is stored in the database 35. In a case where the number of entries of the node determined to be the insertion destination of the entry exceeds the entry threshold value due to the insertion of the entry, it is determined whether to change the entry threshold value of the node. Specifically, in a case where the distribution state of a group of degrees of similarity between representative feature value data and each feature value data, indicated by the node which is the insertion destination, and feature value data to be inserted is a state where the abnormal value is not present due to the uniformity (low dispersion) of the distribution state, the entry threshold value regarding the node is incremented.

Therefore, according to the third exemplary embodiment, similar pieces of feature value data can be avoided being disposed in different nodes due to the limitation (entry threshold value) of the number of entries of the node, and are likely to be disposed in one node. As a result, as described in the first exemplary embodiment, it is possible to improve a recall ratio of similarity retrieval and to easily limit the number of entries which are targets for the calculation of the degree of similarity, and thus it is possible to improve the processing speed of the similarity retrieval. Further, it is possible to suppress an unnecessary increase in the number of nodes by making similar pieces of data likely to be collected in one node. Thereby, it is possible to reduce the number of accesses to the node and to improve a processing speed.

The above-described exemplary embodiments will be described in more detail by using examples below. The invention is not limited to the following examples.

EXAMPLE 1

Example 1 corresponds to the above-described third exemplary embodiment. Hereinafter, the operation of the retrieval apparatus 1 and the index generation method in Example 1 will be described with reference to FIG. 11.

Figure 12:
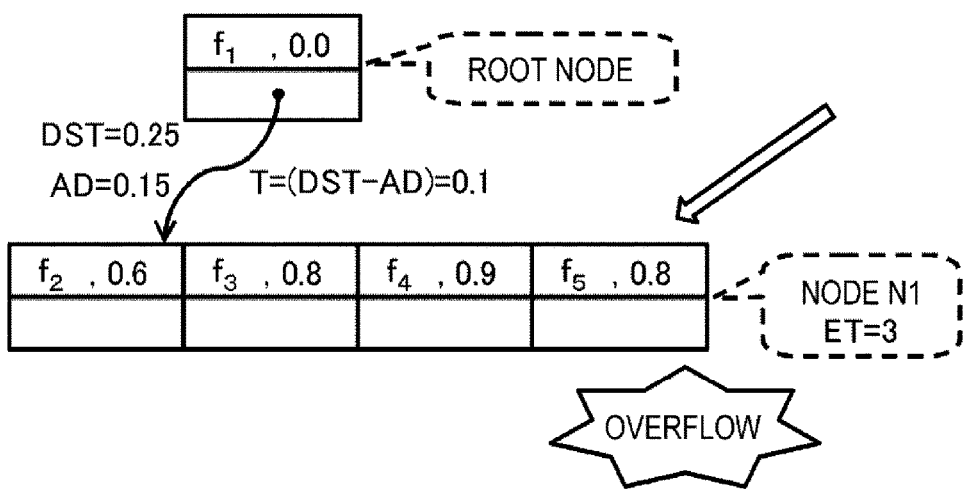
FIG. 12 is a schematic diagram illustrating an index generation procedure in Example 1.

FIGS. 12 to 22 are schematic diagram illustrating an index generation procedure in Example 1. In Example 1, as illustrated in FIG. 12, it is assumed that the root node having the entry having the pointer to the child node, the DS threshold value (DST), the adjustment value (AD), and the feature value data f1 set therein has been already generated. In addition, it is assumed that the entry threshold value (ET) of the node N1 is set to 3. In addition, hereinafter, the feature value data will be simply referred to as data.

The retrieval apparatus 1 acquires data f5 which is the index target (S50). The retrieval apparatus 1 acquires the degree of similarity (0.8) between the data f1 and the data f5, and acquire the DS threshold value (DST=0.25) and the adjustment value (AD=0.15), which are set in the entry including the data f1, from the database 35. The retrieval apparatus 1 calculates the similarity degree threshold value (T=0.1) from the DS threshold value and the adjustment value, and sets the node N1 which is the child node of the root node to be the target node because the degree of similarity (0.8) is larger than the similarity degree threshold value (0.1) (S53). Here, since the node N1 is the leaf node (S54; YES), the retrieval apparatus 1 adds the entry including the data f5 to the target node N1 (S55).

Since the number of entries (4) of the target node exceeds the entry threshold value (ET=3) of the target node N1 (S56; YES), the retrieval apparatus 1 performs the detection of the abnormal value. Specifically, the retrieval apparatus 1 performs the detection of the abnormal value on a group of degrees of similarity (0.6, 0.8, 0.9, 0.8) between the representative feature value data f1 and each feature value data f2, f3, f4, and f5 included in the target node N1. In a case where the abnormal value is not detected (S122; NO), the retrieval apparatus 1 increments the entry threshold value (ET) of the target node N1 by 1 (S123), and terminates the process. As a result, the entry threshold value (ET=4) of the target node N1 is stored in the database 35 (S63).

In a case where the abnormal value is detected (S122; YES), the retrieval apparatus 1 performs overflow adjustment. In the overflow adjustment, the retrieval apparatus 1 selects the representative entry of the target node N1 (S57). According to the example of FIG. 13, the entry including the data f2 is selected as the representative entry. Subsequently, the retrieval apparatus 1 determines the DS threshold value (DST=0.88) (S58), and further determines the adjustment value (AD=0.08) (S59). The DS threshold value (0.88) determined herein is determined to be a value larger than the DS threshold value (DST=0.25) which is set in the entry of the root node in accordance with a hierarchical position. In addition, the adjustment value (0.08) is determined to be a value smaller than the adjustment value (0.15) of the root node in accordance with the DS threshold value.

Figure 13:
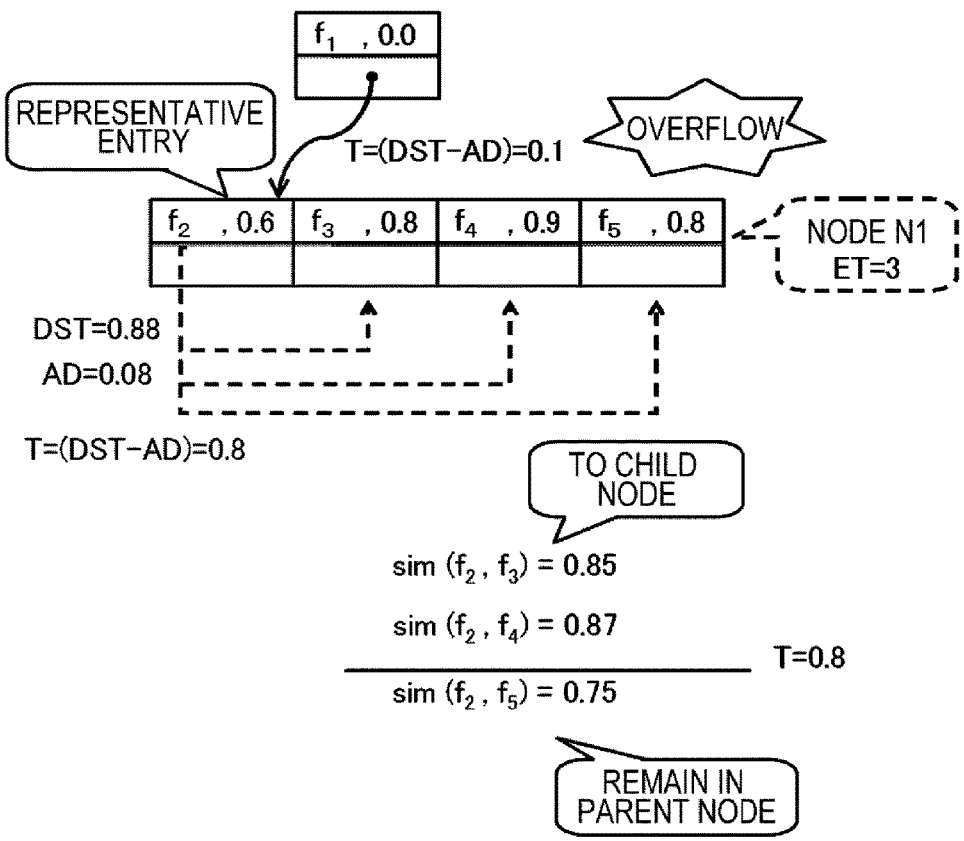
FIG. 13 is a schematic diagram illustrating an index generation procedure in Example 1.
Figure 14:
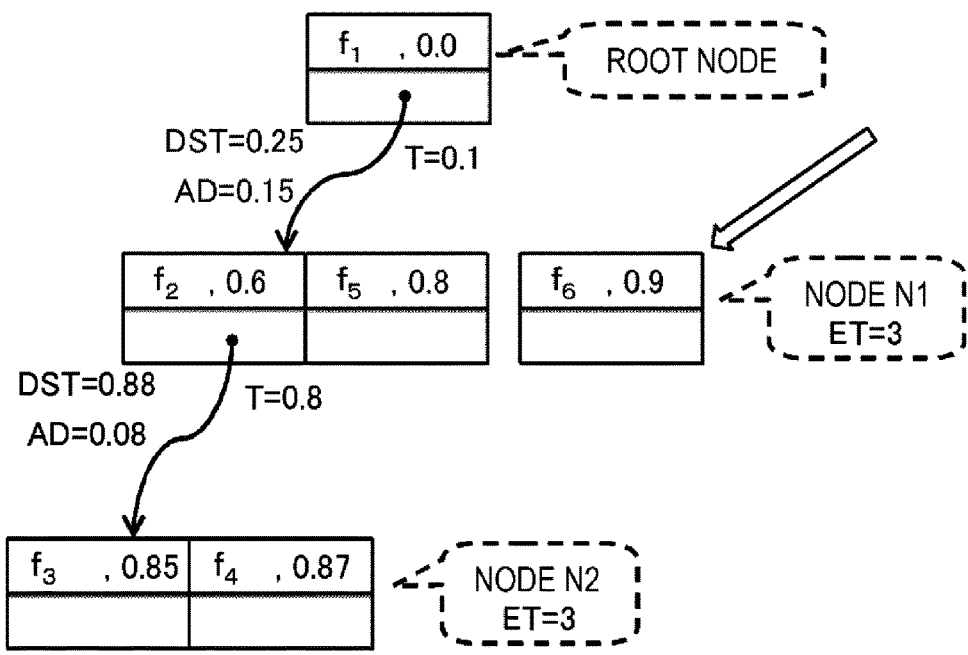
FIG. 14 is a schematic diagram illustrating an index generation procedure in Example 1.

The retrieval apparatus 1 calculates the degree of similarity between the data f2 of the representative entry and each of data f3, f4, and f5 of other entries (S60). Degrees of similarity as illustrated in the example of FIG. 13 are calculated. Further, the retrieval apparatus 1 subtracts the adjustment value (0.08) from the DS threshold value (0.88) which is determined as described above, to thereby calculate the similarity degree threshold value (0.8) corresponding to the representative entry. Thereby, the retrieval apparatus 1 generates the child node N2 including two entries respectively having data f3 and f4 indicating the degree of similarity being equal to or greater than the similarity degree threshold value (0.8), as illustrated in FIG. 14 (S61). At this time, the retrieval apparatus 1 determines the entry threshold value of the generated child node N2 to be an initial value (3), and stores the determined entry threshold value in the database 35. Further, the retrieval apparatus 1 sets a pointer to the child node N2, the DS threshold value (0.88), and the adjustment value (0.08) in the representative entry of the target node N1 (S62). The retrieval apparatus 1 stores the data f5 in the database 35 and stores updated similarity degree tree data in the database 35 (S63).

Subsequently, as illustrated in FIG. 14, the retrieval apparatus 1 acquires new data f6 (S50). Since the degree of similarity (0.9) between the data f1 and the data f6 is larger than the similarity degree threshold value (0.1) calculated from the DS threshold value and the adjustment value, the retrieval apparatus 1 sets the node N1 which is the child node of the root node to be the target node (S53). Here, since the node N1 is the intermediate node (S54; NO), the retrieval apparatus 1 calculates the degree of similarity between the data f2 and the data f6 which are included in the entry, including the pointer to the child node, which is included in the target node N1. In the example of FIG. 14, since the degree of similarity between the data f2 and the data f6 is 0.85, the retrieval apparatus 1 specifies the entry including the data f2 indicating the degree of similarity being equal to or greater than the similarity degree threshold value (0.8) (S52).

Figure 15:
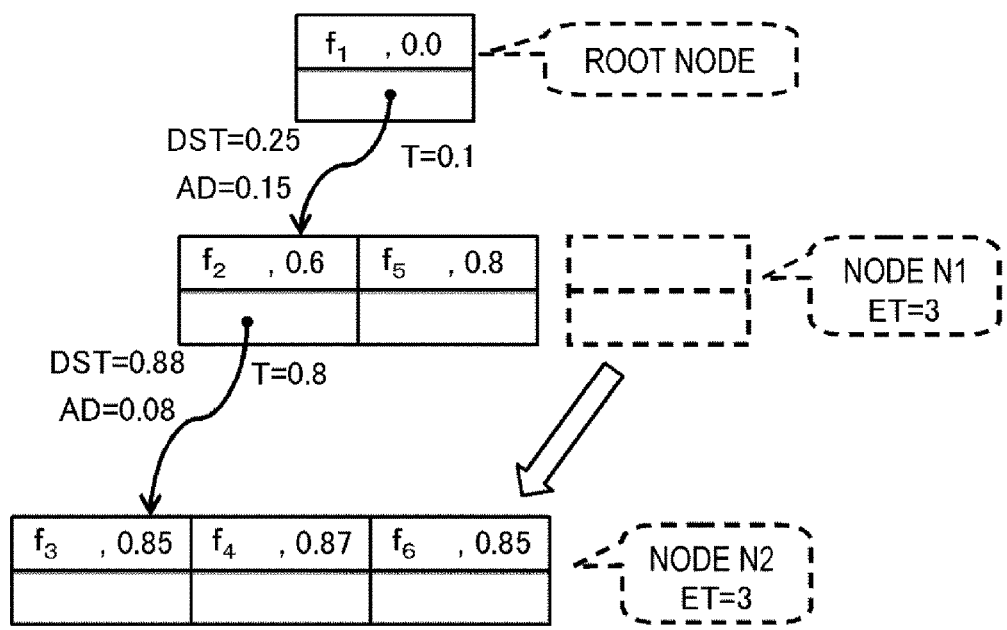
FIG. 15 is a schematic diagram illustrating an index generation procedure in Example 1.

The retrieval apparatus 1 sets the child node N2, indicated by the pointer of the specified entry, to be the target node (S53), and adds the entry including the data f6 to the target node N2, as illustrated in FIG. 15 (S55). Here, since the number of entries (3) of the target node N2 does not exceed the entry threshold value (3) of the target node N2 (S56; NO), the retrieval apparatus 1 stores the data f6 and updated similarity degree tree data in the database 35 (S63).

Figure 16:
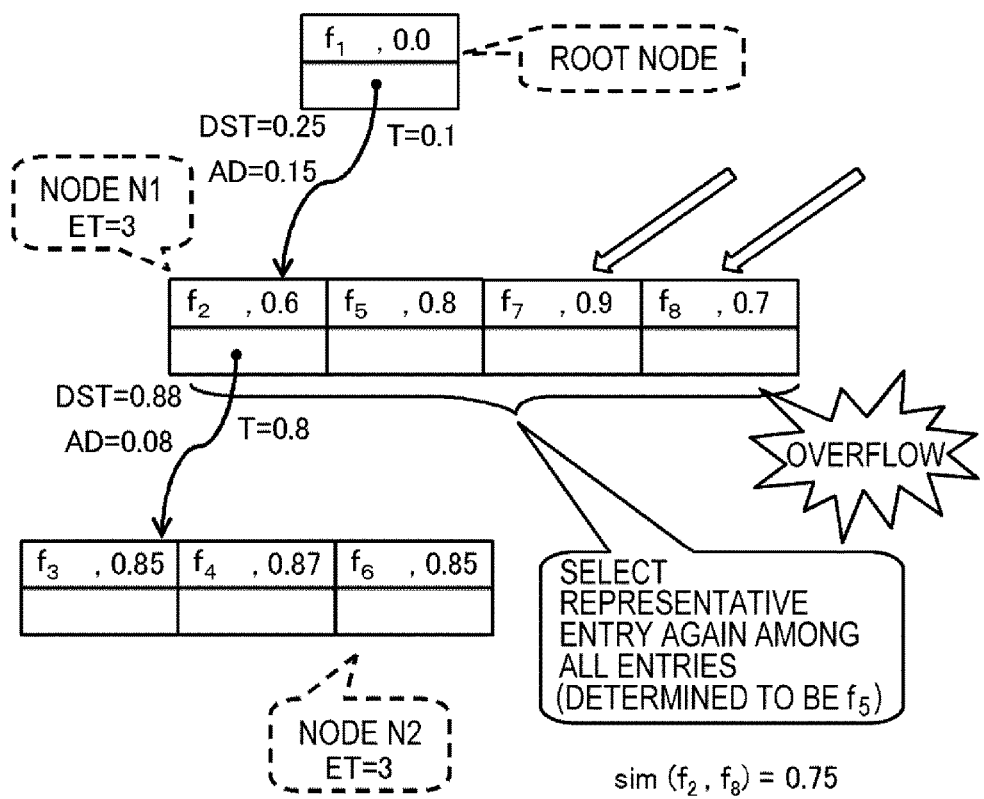
FIG. 16 is a schematic diagram illustrating an index generation procedure in Example 1.

Subsequently, a situation illustrated in FIG. 16 will be described. Here, the retrieval apparatus 1 acquires new data f8 in a state where data f7 is added to the node N1 (S50). The retrieval apparatus 1 sets the node N1 which is the child node of the root node to be the target node because the degree of similarity (0.7) between the data f1 and the data f8 is larger than the similarity degree threshold value (0.1) (S53).

Here, since the node N1 is the intermediate node (S54; NO), the retrieval apparatus 1 calculates the degree of similarity between the data f2 and the data f8 which are included in the entry, including the pointer to the child node, which is included in the target node N1. In the example of FIG. 16, the degree of similarity between the data f2 and the data f8 is 0.75, and the entry including data indicating the degree of similarity being equal to or greater than the similarity degree threshold value (0.8) is not present in the target node N1. Since the corresponding entry is not present in the target node N1 (S52; NO), the retrieval apparatus 1 adds the entry including the data f8 to the target node N1, as illustrated in FIG. 16 (S55).

Since the number of entries (4) of the target node N1 exceeds the entry threshold value (3) of the target node N1 (S56; YES), the retrieval apparatus 1 performs the detection of the abnormal value. Specifically, the retrieval apparatus 1 performs the detection of the abnormal value on a group of degrees of similarity (0.6, 0.8, 0.9, 0.7) between the representative feature value data f1 and each feature value data f2, f5, f7, and f8 included in the target node N1. In a case where the abnormal value is not detected (S122; NO), the retrieval apparatus 1 increments the entry threshold value (ET) of the target node N1 by 1 (S123), and terminates the process. As a result, the entry threshold value (ET=4) of the target node N1 is stored in the database 35 (S63).

In a case where the abnormal value is detected (S122; YES), the retrieval apparatus 1 performs overflow adjustment. In the example of FIG. 16, the retrieval apparatus 1 selects the representative entry from the population of all entries included in the target node N1 (S57). According to the example of FIG. 16, the entry including the data f5 is selected as the representative entry. The retrieval apparatus 1 determines a new DS threshold value and a new adjustment value (S58, S59). Here, the new DS threshold value (DST=0.88) and the new adjustment value (AD=0.08) are determined.

Figure 17:
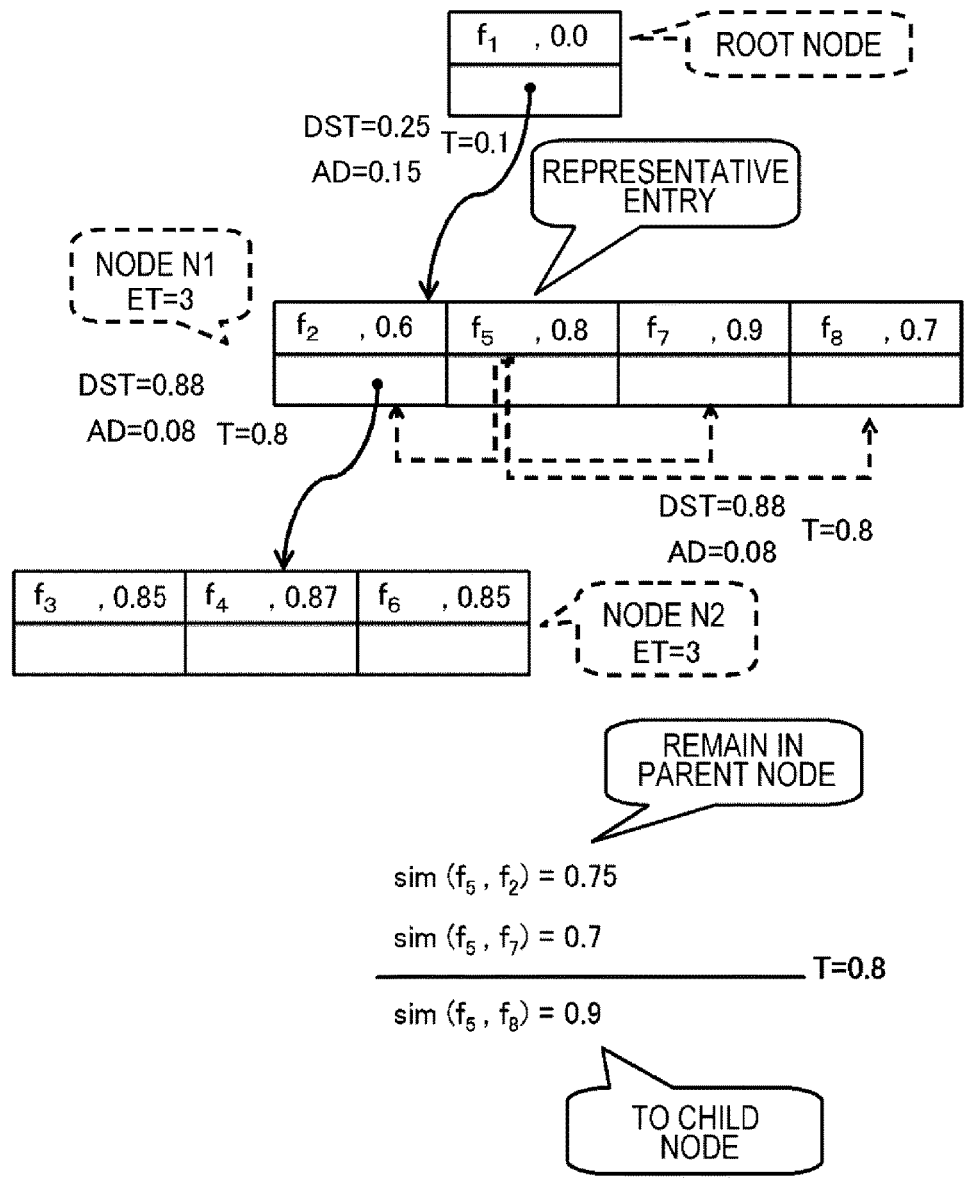
FIG. 17 is a schematic diagram illustrating an index generation procedure in Example 1.
Figure 18:
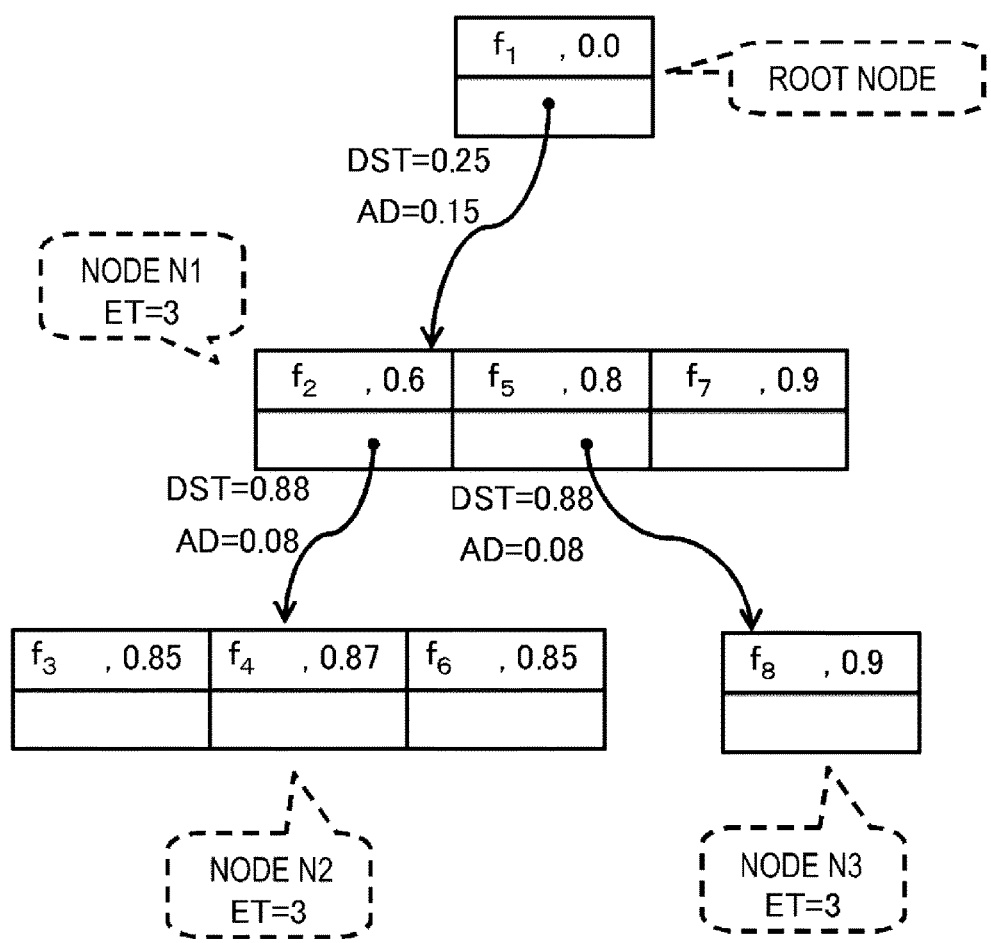
FIG. 18 is a schematic diagram illustrating an index generation procedure in Example 1.

The retrieval apparatus 1 calculates the degree of similarity between the data f5 of the representative entry and each of data f2, f7, and f8 of other entries (S60). Degrees of similarity as illustrated in the example of FIG. 17 are calculated. Further, the retrieval apparatus 1 subtracts the adjustment value (0.08) from the DS threshold value (0.88) which is determined as described above, to thereby calculate the similarity degree threshold value (0.8) corresponding to the representative entry. Thereby, the retrieval apparatus 1 generates the child node N3 including one entry having data f8 indicating the degree of similarity being equal to or greater than the similarity degree threshold value (0.8), as illustrated in FIGS. 17 and 18 (S61). At this time, the retrieval apparatus 1 determines the entry threshold value of the generated child node N3 to be the initial value (3), and stores the determined entry threshold value in the database 35. The retrieval apparatus 1 sets the pointer to the child node N3, the DS threshold value (0.88), and the adjustment value (0.08) in the representative entry including the data f5 in the target node N1 (S62). At this time, the retrieval apparatus 1 determines that the entry including the pointer to the node N2 remains in the node N1, and thus leaves the pointer included in the entry, the DS threshold value, and the adjustment value as they are. Thereby, the updated similarity degree tree is as illustrated in FIG. 18. The retrieval apparatus 1 stores the data f8 in the database 35, and stores updated similarity degree tree data in the database 35 (S63).

Figure 19:
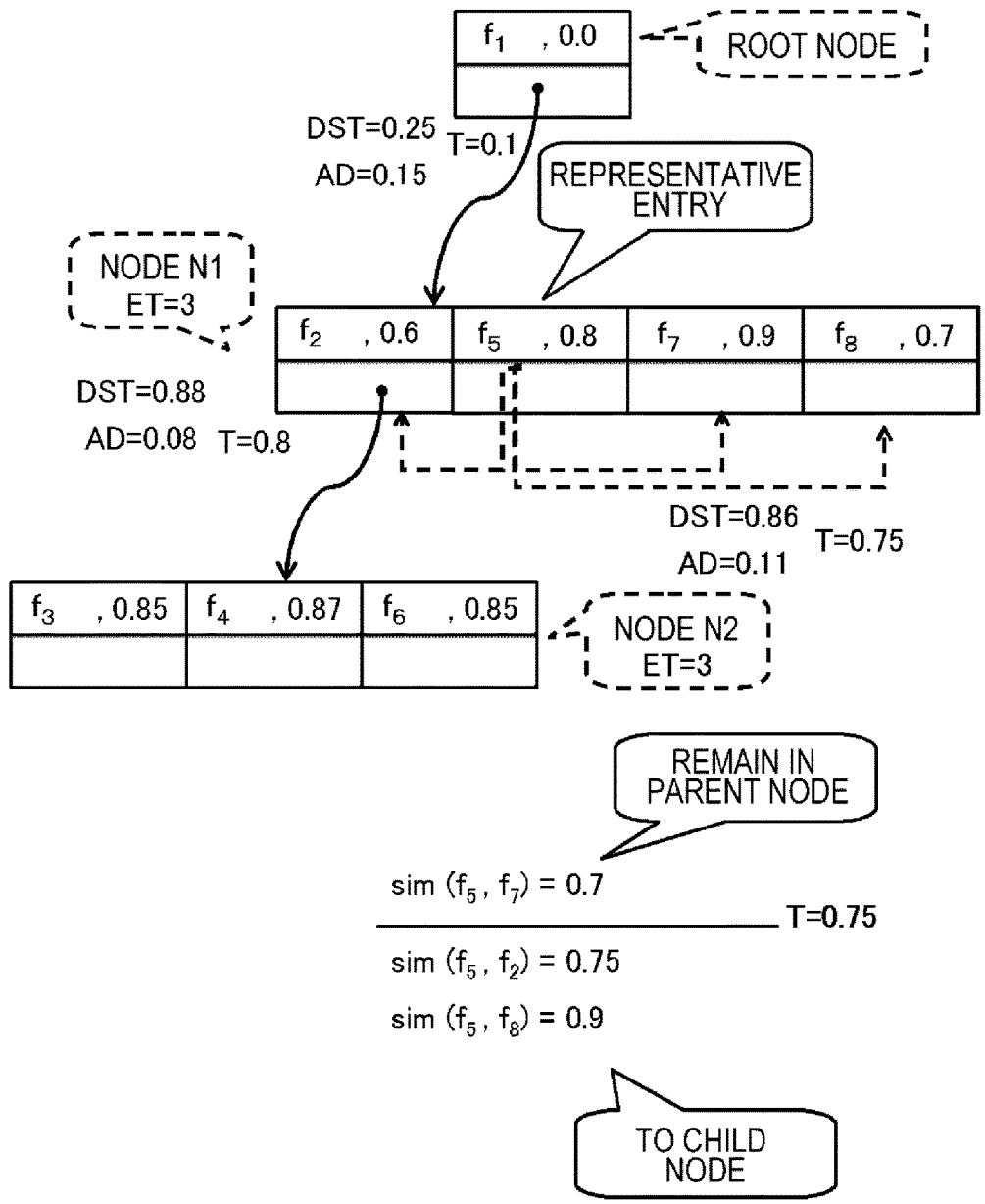
FIG. 19 is a schematic diagram illustrating an index generation procedure in Example 1.
Figure 20:
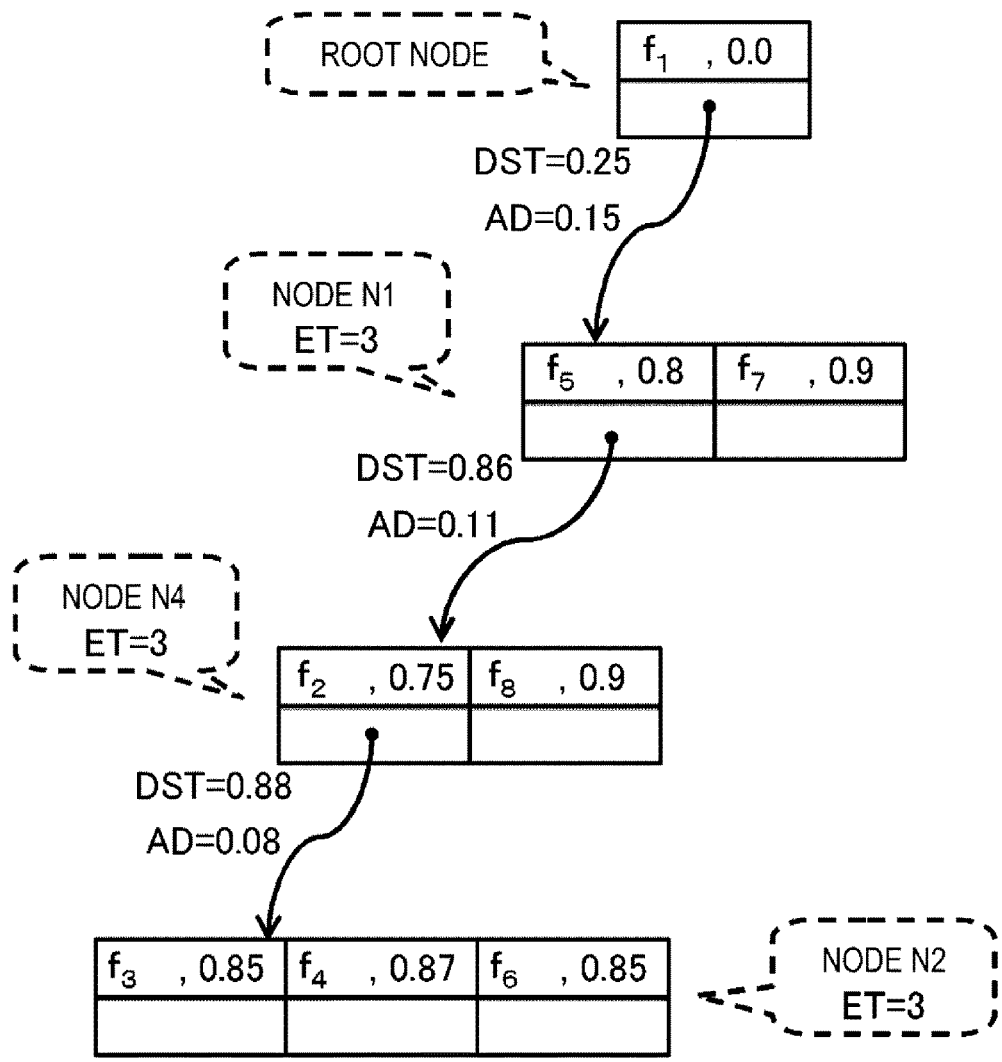
FIG. 20 is a schematic diagram illustrating an index generation procedure in Example 1.

FIGS. 19 and 20 are diagrams illustrating an index generation example different from the examples illustrated in FIGS. 17 and 18. In the example of FIG. 17, the representative entry is determined to be the entry including the data f5, the DS threshold value is determined to be 0.88, and the adjustment value is determined to be 0.08. FIG. 19 illustrates an example in which the DS threshold value is determined to be 0.86 and the adjustment value is determined to be 0.11. The DS threshold value (0.86) determined herein is determined to be a value larger than a DS threshold value (DST=0.25) which is set in the entry of the root node in accordance with a hierarchical position. In addition, the adjustment value (0.11) is determined to be a value which is smaller than the adjustment value (0.15) of the root node and which is larger than the adjustment value (0.08) of the entry including data f2, in accordance with the DS threshold value. In this case, degrees of similarity as illustrated in the example of FIG. 19 are calculated.

In this case, the retrieval apparatus 1 subtracts the adjustment value (0.11) from the DS threshold value (0.86) to thereby calculate the similarity degree threshold value (0.75). The retrieval apparatus 1 determines to move two entries respectively having data f2 and f8 indicating the degree of similarity being equal to or greater than the similarity degree threshold value (0.75), to the child node. However, in this case, the entry including the data f2 is linked with the child node N2. Consequently, the retrieval apparatus 1 generates the child node N4 including two entries respectively having the data f2 and f8 while maintaining the pointer to the child node N2, the DS threshold value (0.88), and the adjustment value (0.08), which are set in the entry including the data f2, as illustrated in FIG. 20 (S61). The retrieval apparatus 1 deletes the two entries respectively having data f2 and f8 from the node N1 serving as the parent node. Further, the retrieval apparatus 1 sets the pointer to the child node N4, the DS threshold value (0.86), and the adjustment value (0.11) in the representative entry including the data f5 in the target node N1 (S62). As a result, the updated similarity degree tree is as illustrated in FIG. 20. As illustrated in FIG. 20, it is possible to realize the overflow adjustment of the node by simple processing by maintaining the link relationship which is already set.

Figure 21:
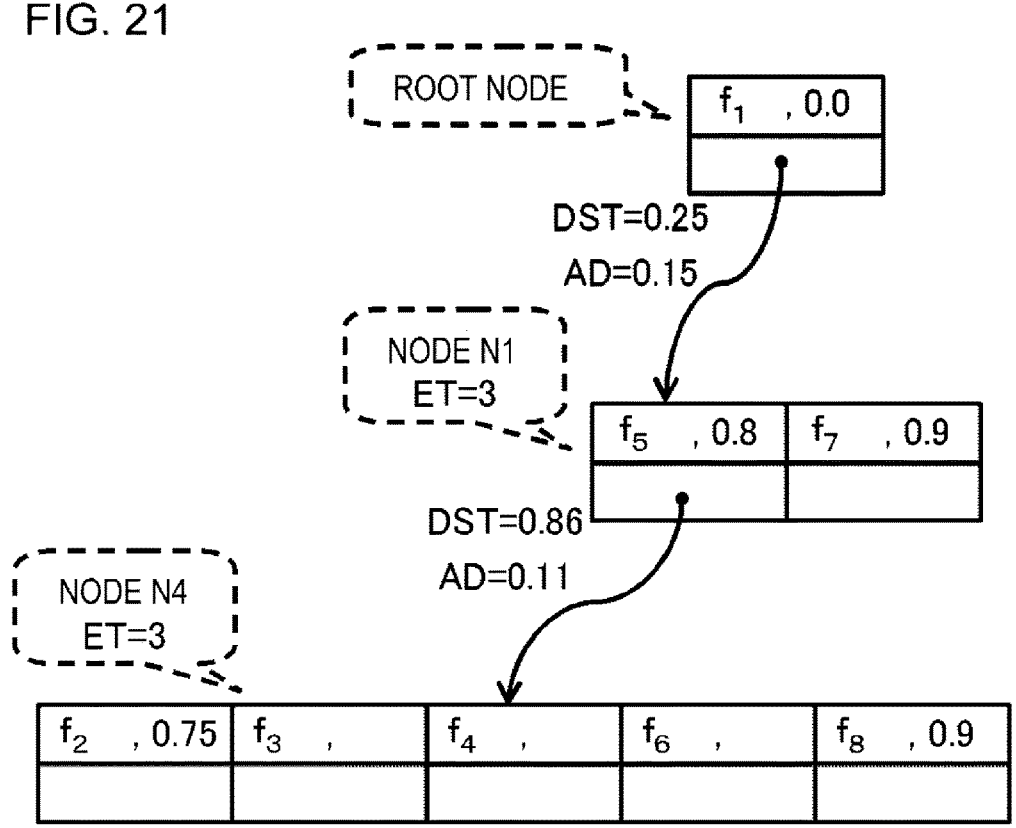
FIG. 21 is a schematic diagram illustrating an index generation procedure in Example 1.

FIG. 21 is a diagram illustrating an index generation example different from the example illustrated in FIG. 20. In a case where the retrieval apparatus 1 determines to move an entry, which is already linked with the child node, to the child node in the overflow adjustment of the node, the retrieval apparatus may cancel the link relationship which is already set, as illustrated in FIG. 21. In this case, the retrieval apparatus 1 generates the child node N4 including three entries (including data f3, f4, and f6) which are included in the child node N2, together with two entries respectively including data f2 and f8, as illustrated in FIG. 21 (S61), and deletes the two entries respectively including the data f2 and f8 from the node N1 serving as the parent node.

In the examples of FIGS. 19, 20, and 21, the degree of similarity between the data f5 included in the representative entry and each of data f3, f4, and f6 included in the node N2 may not be calculated during the overflow adjustment of the node N1. This is based on the above-described rule. That is, this is because the data f2 is representative data indicating the degree of similarity with respect to each of data f3, f4, and f6 being equal to or greater than the similarity degree threshold value (0.88−0.08=0.8), and is highly likely to have the degree of similarity being equal to or greater than the similarity degree threshold value (0.86−0.11=0.75) with respect to the data set (f3, f4, and f6) of the representative data f2 and the data f5 in a case where the representative data f2 and the data f5 have the degree of similarity being equal to or greater than the similarity degree threshold value (0.86−0.11=0.75).

Figure 22:
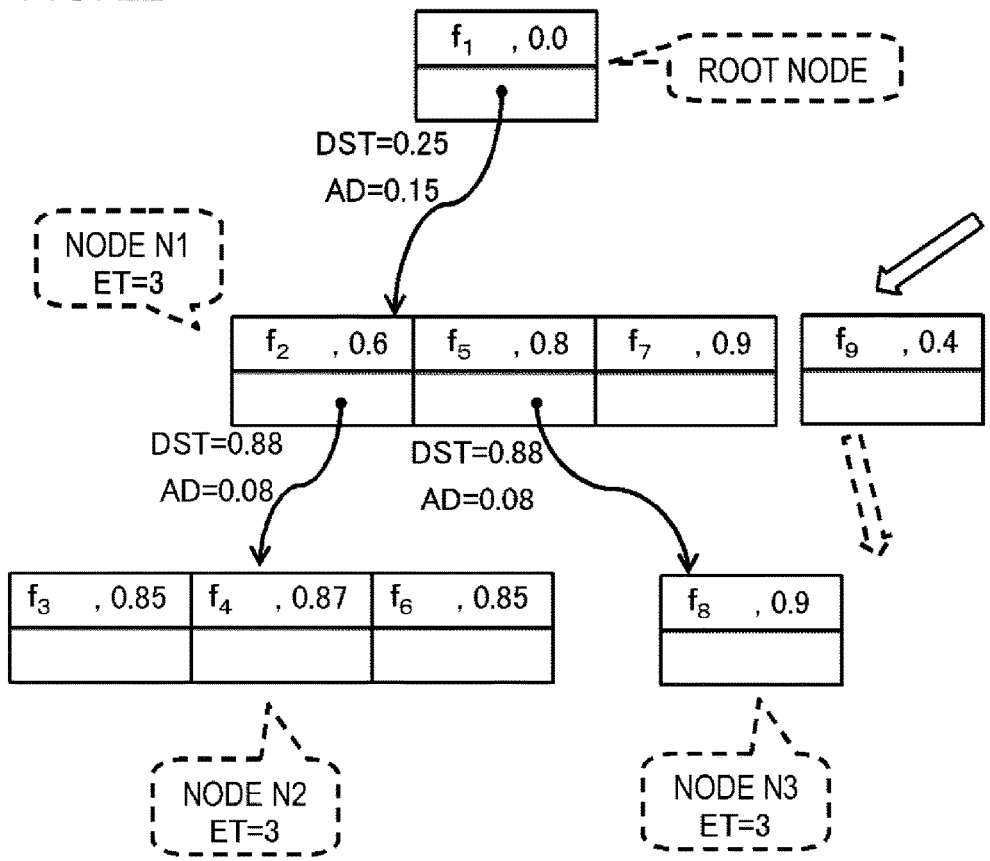
FIG. 22 is a schematic diagram illustrating an index generation procedure in Example 1.

FIG. 22 is a schematic diagram illustrating an index generation procedure in a case where new data f9 is acquired in a state where the similarity degree tree illustrated in FIG. 18 has been already generated. In this case, the retrieval apparatus 1 calculates the degree of similarity between data f9 and each of data f2 and f5 respectively included in two entries, including the pointer to the child node, which are included in the target node N1. In the example of FIG. 22, the degree of similarity between the data f2 and the data f9 is 0.85, and the degree of similarity is larger than the similarity degree threshold value (0.88−0.08=0.8) of the entry of the data f2. Further, the degree of similarity between the data f5 and the data f9 is 0.86, and the degree of similarity is larger than the similarity degree threshold value (0.88−0.08=0.8) of the entry of the data f5. That is, there are a plurality of entries corresponding to (S52) (S52; YES).

In this case, the retrieval apparatus 1 specifies the entry which satisfies the condition of (S52) and has the maximum degree of similarity with respect to the data f9, that is, the entry that includes the data f5. The retrieval apparatus 1 sets the child node N3, indicated by the pointer of the entry including the data f5, to be the target node (S53). The retrieval apparatus 1 adds the entry including the data f9 to the target node N3 (S55).

EXAMPLE 2

Example 2 corresponds to the above-described second exemplary embodiment. Hereinafter, the operation of the retrieval apparatus 1 in Example 2 and the index generation method will be described with reference to FIG. 5. Example 2 shows an example in which the entry including the pointer to the child node includes two pieces of representative feature value data of a set of feature value data indicated by the child node. In addition, a description is given of an example in which data having the degree of similarity with respect to each of two pieces of feature value data of the entry, including the pointer to the child node, being equal to or greater than the similarity degree threshold value is the target to be added to the child node.

Figure 23:
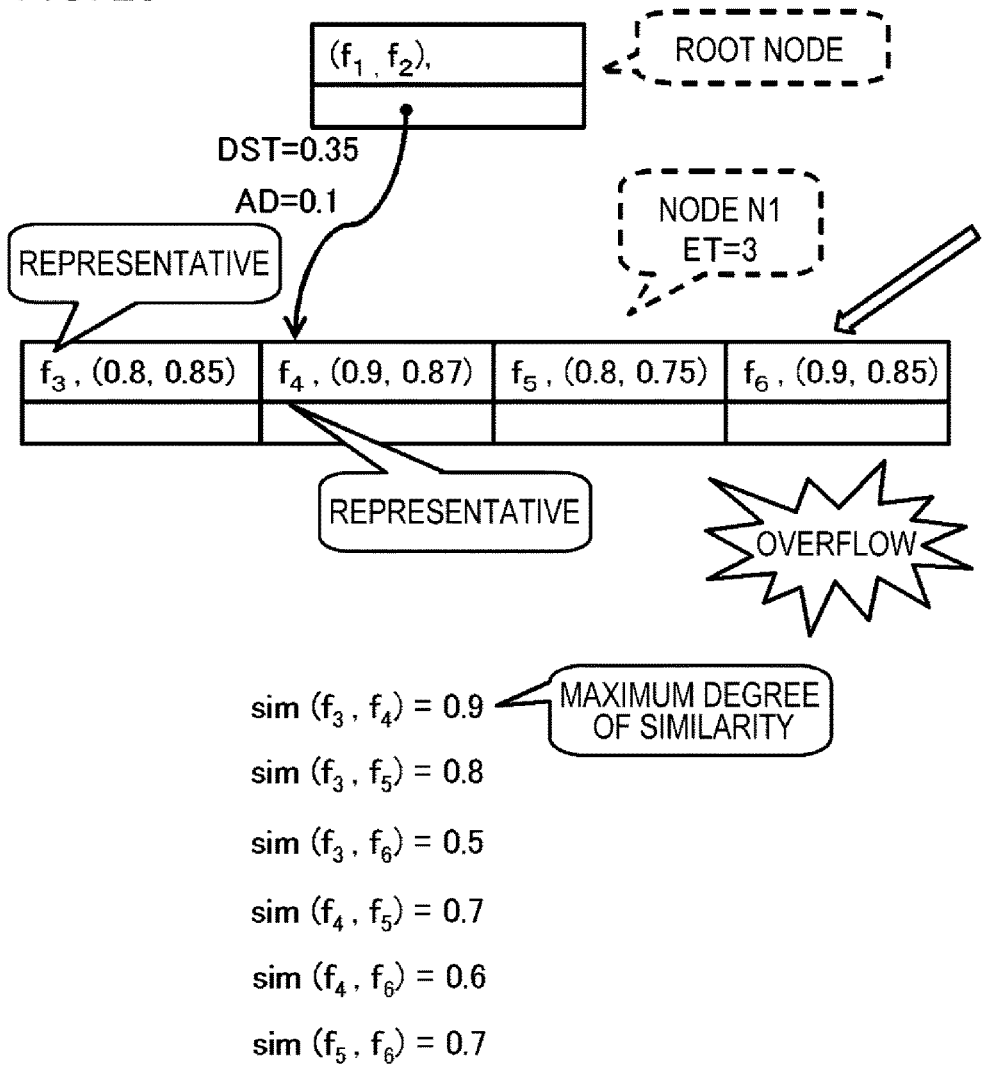
FIG. 23 is a schematic diagram illustrating an index generation procedure in Example 2.
Figure 24:
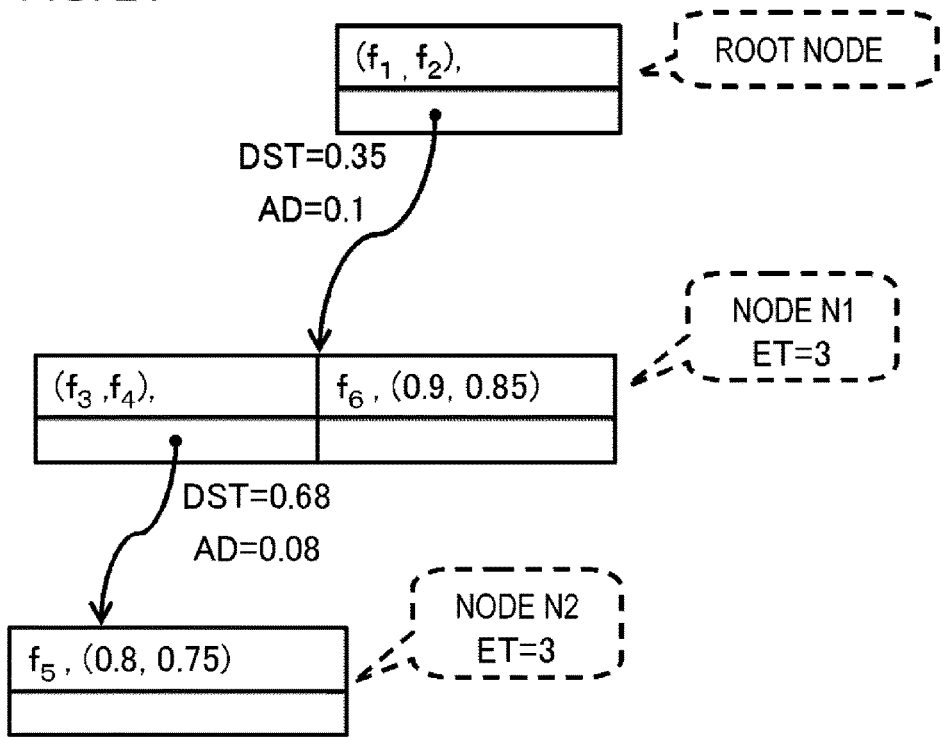
FIG. 24 is a schematic diagram illustrating an index generation procedure in Example 2.

FIGS. 23 and 24 are schematic diagrams illustrating an index generation procedure in Example 2. As illustrated in FIG. 23, the root node having the entry, having the pointer to the child node, the DS threshold value (0.35), the adjustment value (0.1), and pieces of data f1 and f2 set therein, is already generated, and three entries including pieces of data f3, f4, and f5 are set in the node N1.

In this state, the retrieval apparatus 1 acquires data f6 (S50). The retrieval apparatus 1 sets the node N1 which is the child node of the root node to be the target node because the degree of similarity (0.9, 0.85) between each of data f1 and f2 and the data f6 is larger than the similarity degree threshold value (0.35−0.1=0.25) (S53). Here, since the node N1 is the leaf node (S54; YES), the retrieval apparatus 1 adds the entry including the data f6 to the target node N1 (S55).

Since the number of entries (4) of the target node N1 exceeds the entry threshold value (3) of the target node N1 (S56; YES), the retrieval apparatus 1 performs the detection of the abnormal value. Specifically, the retrieval apparatus 1 performs the detection of the abnormal value on a group of degrees of similarity (0.8, 0.9, 0.8, 0.9) between the representative feature value data f1 and each of feature value data f3, f4, f5, and f6 included in the target node N1 and a group of degrees of similarity (0.85, 0.87, 0.75, 0.85) between the representative feature value data f2 and each of feature value data f3, f4, f5, and f6 included in the target node N1. In a case where the abnormal value is not detected (S122; NO), the retrieval apparatus 1 increments the entry threshold value (ET) of the target node N1 by 1 (S123), and terminates the process. As a result, the entry threshold value (ET=4) of the target node N1 is stored in the database 35 (S63).

In a case where the abnormal value is detected (S122; YES), the retrieval apparatus 1 performs overflow adjustment. In the overflow adjustment, the retrieval apparatus 1 selects two pieces of data among all data of all entries included in the target node N1 as representatives, as illustrated in FIG. 23 (S57). Here, the above-described first selection method is used, and thus the retrieval apparatus 1 selects two pieces of data for which the degree of similarity therebetween has the maximum value, as representatives. In the example of FIG. 23, data f3 and data f4 are selected as representatives. Subsequently, the retrieval apparatus 1 determines a new DS threshold value (0.68) and a new adjustment value (0.08) (S58, S59).

The retrieval apparatus 1 calculates the degree of similarity between each of data f3 and f4 selected as representatives and each of data f5 and f6 of other entries (S60). Here, degrees of similarity as illustrated in the example of FIG. 24 are calculated. Further, the retrieval apparatus 1 subtracts the adjustment value (0.08) from the DS threshold value (0.68) to thereby calculate the similarity degree threshold value (0.6). Thereby, the retrieval apparatus 1 generates the child node N2 including one entry having data f5 indicating the degree of similarity with respect to each of data f3 and f4 being equal to or greater than the similarity degree threshold value (0.6), as illustrated in FIG. 24 (S61). In the example of FIG. 24, the degree of similarity (0.6) between the data f6 and the data f4 is equal to or greater than the similarity degree threshold value (0.6), but the degree of similarity (0.5) between the data f6 and the data f3 is less than the similarity degree threshold value (0.6), and thus the data f6 is left in the node N1.

The retrieval apparatus 1 generates one entry including the data f3 and f4 in the target node N1, and sets the pointer to the child node N2, the DS threshold value (0.68), and the adjustment value (0.08) in the entry (S62). Thereby, the updated similarity degree tree is as illustrated in FIG. 24.

Modification Example

In the above-described exemplary embodiments and examples, an entry indicating representative feature value data is included in only the parent node, but may be included in both the parent node and the child node.

In addition, in the above-described exemplary embodiments, the retrieval apparatus 1 is realized as one apparatus (computer), but may be realized as a plurality of apparatuses. The above-described exemplary embodiments may be constituted by, for example, an index generation apparatus that generates the similarity degree tree and a retrieval apparatus that performs similarity retrieval. In this case, the index generation apparatus includes the target acquisition unit 20, the index generation unit 21, the threshold value determination unit 22, the similarity degree acquisition unit 25, and the entry adjustment unit 40, and the retrieval apparatus includes the retrieval unit 30 and the database 35. Further, each of the exemplary embodiments may be constituted by an index generation apparatus, a retrieval apparatus, and a database apparatus.

In addition, in a plurality of flow charts used in the above description, a plurality of steps (processes) are described in order, but the order of execution of the steps performed in each of the exemplary embodiments is not limited to the described order. In the exemplary embodiments, the order of the steps shown in the drawings can be changed within a range in which any trouble does not occur in terms of contents. In addition, the above-described exemplary embodiments and modification example can be combined with each other within a range in which the contents thereof do not conflict with each other.

A portion or the entirety of the above-described exemplary embodiments and modification example may also be specified as follows. However, the exemplary embodiments and the modification example are not limited to the following description.

1. An index generation apparatus that generates an index in which a plurality of nodes are hierarchized, each of the nodes including at least one entry indicating data being an index target, the index generation apparatus comprising:

an index generation unit generating the index including a lower node and an upper node by using a degree of similarity between pieces of data, the upper node including an entry having a link relationship with the lower node and indicating representative data, the representative data having the degree of similarity with respect to data indicated by the entry of the lower node that is equal to or greater than a similarity degree threshold value given to the link relationship; and a threshold value determination unit determining a default similarity degree threshold value and an adjustment value with respect to each link relationship between the upper node and the lower node, and determining each similarity degree threshold value to be given to each link relationship by subtracting the adjustment value from the default similarity degree threshold value.

2. The index generation apparatus according to 1., wherein the threshold value determination unit determines the adjustment value so that the adjustment value becomes smaller as the default similarity degree threshold value becomes larger.

3. The index generation apparatus according to 1. or 2., wherein the threshold value determination unit sets the default similarity degree threshold value to be a value that becomes larger as a hierarchy gets lower, and sets the adjustment value to be a value which becomes smaller as a hierarchy gets lower.

4. The index generation apparatus according to 1., wherein the threshold value determination unit determines the adjustment value regarding the link relationship to be a value which becomes smaller as a degree of dispersion of degrees of similarity between the representative data indicated by the upper node and each of a plurality of data indicated by entries of the lower node becomes smaller.

5. The index generation apparatus according to 4., wherein the threshold value determination unit determines a value, obtained by dividing a standard deviation of the degrees of similarity between the representative data indicated by the upper node and each of the plurality of data indicated by the entries of the lower node by the number of entries of the lower node, to be the adjustment value regarding the link relationship.

6. The index generation apparatus according to any one of 1. to 5., further comprising:

a target acquisition unit acquiring index target data; and a similarity degree acquisition unit acquiring degree of similarity between the representative data indicated by the entry of the upper node and the index target data acquired by the target acquisition unit, wherein the index generation unit compares the degree of similarity acquired by the similarity degree acquisition unit with the similarity degree threshold value calculated from the default similarity degree threshold value and the adjustment value, and determines an insertion destination of a new entry indicating the index target data to be the upper node or the lower node on the basis of a result of the comparison, wherein the index generation unit includes:

a representative selection unit selecting the representative entry from a target entry set including the entry, included in a target node determined to be the insertion destination of the new entry, and the new entry, and an overflow adjustment unit selecting, from the target entry set other than the selected representative entry, the entry indicating data having the degree of similarity with respect to data indicated by the selected representative entry that is equal to or greater than a new default similarity degree threshold value or a new similarity degree threshold value determined by the threshold value determination unit in a case where the number of entries of the target entry set exceeds an entry threshold value, generating the lower node including the selected entry, setting the link relationship with the lower node in the selected representative entry of the target node, and giving a new default similarity degree threshold value and a new adjustment value to the link relationship.

7. A retrieval apparatus that uses the index generated by the index generation apparatus according to any one of 1. to 6., the retrieval apparatus including;

a condition acquisition unit acquiring retrieval target data and a similarity degree condition;

a similarity degree acquisition unit acquiring the degree of similarity between the representative data indicated by the entry of the upper node and the retrieval target data; and a retrieval processing unit comparing the degree of similarity acquired by the similarity degree acquisition unit, with the similarity degree condition or the similarity degree threshold value calculated from the adjustment value and the default similarity degree threshold value determined with respect to the link relationship of the entry indicating the representative data, and excluding the entry indicating the at least one representative data included in the upper node and the entry of the lower node below the lower node having the link relationship with the entry, from extraction targets that satisfy the similarity degree condition with respect to the retrieval target data, on the basis of a result of the comparison.

8. The index generation apparatus according to any one of 1. to 6., further comprising:

a target acquisition unit acquiring index target data; and an entry adjustment unit determining an entry threshold value indicating a maximum number of entries within a node, with respect to each of the plurality of nodes, wherein the entry adjustment unit determines whether to change the entry threshold value regarding the lower node on the basis of a distribution state of a group of degrees of similarity between the representative data and each of a plurality of data indicated by a plurality of entries included in the lower node, and the index target data, in a case where an insertion destination of the entry indicating the index target data is determined to be the lower node by the index generation unit.

9. The index generation apparatus according to 8., wherein the entry adjustment unit determines whether or not the number of entries within the lower node exceeds the entry threshold value in a case where the entry indicating the index target data is inserted into the lower node, performs detection of an abnormal value on a degree of similarity between the representative data and each of the plurality of data and the index target data in a case where the number of entries exceeds the entry threshold value, increments the entry threshold value in a case where the abnormal value is not detected, and does not change the entry threshold value in a case where the abnormal value is detected.

10. An index generation method of generating an index in which a plurality of nodes are hierarchized, each of the nodes including at least one entry indicating data being an index target, the index generation method comprising:

generating the index including a lower node and an upper node, the upper node including an entry having a link relationship with the lower node and indicating representative data, the representative data having a degree of similarity with respect to data being indicated by the entry of the lower node that is equal to or greater than a similarity degree threshold value given to the link relationship;

determining a default similarity degree threshold value and an adjustment value with respect to each link relationship between the upper node and the lower node; and determining each similarity degree threshold value to be given to each link relationship by subtracting the adjustment value from the default similarity degree threshold value.

11. The index generation method according to 10., wherein the adjustment value is determined to become smaller as the default similarity degree threshold value becomes larger.

12. The index generation method according to 10. or 11., wherein the default similarity degree threshold value is determined to be a value that becomes larger as a hierarchy gets lower, and wherein the adjustment value is determined to be a value which becomes smaller as a hierarchy gets lower.

13. The index generation method according to 10., wherein the adjustment value regarding the link relationship is determined to be a value which becomes smaller as a degree of dispersion of degrees of similarity between the representative data indicated by the upper node and each of a plurality of data indicated by entries of the lower node becomes smaller.

14. The index generation method according to 13., wherein the adjustment value regarding the link relationship is determined to be a value which is obtained by dividing a standard deviation of the degrees of similarity between the representative data indicated by the upper node and each of the plurality of data indicated by the entries of the lower node by the number of entries of the lower node.

15. The index generation method according to any one of 10. to 14., further including:

acquiring index target data;

acquiring a degree of similarity between the representative data indicated by the entry of the upper node and the acquired index target data;

comparing the acquired degree of similarity with a similarity degree threshold value calculated from the default similarity degree threshold value and the adjustment value;

determining an insertion destination of a new entry indicating the index target data to be the upper node or the lower node on the basis of a result of the comparison;

selecting the representative entry from the target entry set including the entry, included in a target node determined to be the insertion destination of the new entry, and the new entry;

selecting, from the target entry set other than the selected representative entry, the entry indicating data having the degree of similarity with respect to data indicated by the selected representative entry that is equal to or greater than a new default similarity degree threshold value or a new similarity degree threshold value in a case where the number of entries of the target entry set exceeds an entry threshold value;

generating the lower node including the selected entry;

setting the link relationship with the lower node in the selected representative entry of the target node;

and giving a new similarity degree threshold value to the link relationship.

16. A retrieval method that uses the index generated by the index generation method according to any one of 10. to 15., the retrieval method including:

acquiring retrieval target data and a similarity degree condition;

acquiring the degree of similarity between the representative data indicated by the entry of the upper node and the retrieval target data;

comparing the degree of similarity acquired by the similarity degree acquisition unit, with the similarity degree condition or the similarity degree threshold value calculated from the adjustment value and the default similarity degree threshold value determined with respect to the link relationship of the entry indicating the representative data; and excluding the entry indicating the at least one representative data included in the upper node and the entry of the lower node below the lower node having the link relationship with the entry, from extraction targets that satisfy the similarity degree condition with respect to the retrieval target data, on the basis of a result of the comparison.

17. The index generation method according to any one of 10. to 15., further including:

acquiring index target data; and determining an entry threshold value indicating a maximum number of entries within a node, with respect to each of the plurality of nodes, wherein the determining of the entry threshold value includes determining whether to change the entry threshold value regarding the lower node on the basis of a distribution state of a group of degrees of similarity between the representative data and each of a plurality of data indicated by a plurality of entries included in the lower node, and the index target data, in a case where an insertion destination of the entry indicating the index target data is determined to be the lower node.

18. The index generation method according to 17, wherein the determining of the entry threshold value includes:

determining whether or not the number of entries within the lower node exceeds the entry threshold value in a case where the entry indicating the index target data is inserted into the lower node;

performing detection of an abnormal value on the degree of similarity between the representative data and each of the plurality of data and the index target data in a case where the number of entries exceeds the entry threshold value; and incrementing the entry threshold value in a case where the abnormal value is not detected, and not changing the entry threshold value in a case where the abnormal value is detected.

19. An index generation apparatus that generates an index in which a plurality of nodes are hierarchized, each of the nodes including at least one entry indicating data being an index target, the index generation apparatus comprising:

an index generation unit generating the index including a lower node and an upper node by using a degree of similarity between pieces of data, the upper node including an entry having a link relationship with the lower node and indicating representative data, the representative data having the degree of similarity with respect to data indicated by the entry of the lower node that is equal to or greater than a similarity degree threshold value given to the link relationship; and an entry adjustment unit determining an entry threshold value indicating a maximum number of entries within the node, with respect to each of the plurality of nodes, wherein the entry adjustment unit determines whether to change the entry threshold value regarding the lower node on the basis of a distribution state of a group of degrees of similarity between the representative data and each of a plurality of data indicated by a plurality of entries included in the lower node, and the index target data, in a case where an insertion destination of the entry indicating the index target data is determined to be the lower node by the index generation unit.

20. The index generation apparatus according to 19., wherein the entry adjustment unit determines whether or not the number of entries within the lower node exceeds the entry threshold value in a case where the entry indicating the index target data is inserted into the lower node, performs detection of an abnormal value on the degree of similarity between the representative data and each of the plurality of data and the index target data in a case where the number of entries exceeds the entry threshold value, increments the entry threshold value in a case where the abnormal value is not detected, and does not change the entry threshold value in a case where the abnormal value is detected.

21. An index generation method of generating an index in which a plurality of nodes are hierarchized, each of the nodes including at least one entry indicating data being an index target, the index generation method including:

generating the index including a lower node and an upper node, the upper node including an entry having a link relationship with the lower node and indicating representative data, the representative data having a degree of similarity with respect to data being indicated by the entry of the lower node that is equal to or greater than a similarity degree threshold value given to the link relationship; and determining an entry threshold value indicating a maximum number of entries within the node, with respect to each of the plurality of nodes, wherein the determining of the entry threshold value includes determining whether to change the entry threshold value regarding the lower node on the basis of a distribution state of a group of degrees of similarity between the representative data and each of a plurality of data indicated by a plurality of entries included in the lower node, and the index target data, in a case where an insertion destination of the entry indicating the index target data is determined to be the lower node.

22. The index generation method according to 21., wherein the determining of the entry threshold value includes:

determining whether or not the number of entries within the lower node exceeds the entry threshold value in a case where the entry indicating the index target data is inserted into the lower node;

performing detection of an abnormal value on the degree of similarity between the representative data and each of the plurality of data and the index target data in a case where the number of entries exceeds the entry threshold value; and incrementing the entry threshold value in a case where the abnormal value is not detected, and not changing the entry threshold value in a case where the abnormal value is detected.

23. A program causing at least one computer to perform the index generation method according to any one of 10. to 15., 17., 18., 21., and 22.

24. A program causing at least one computer to perform the retrieval method according to 16.

25. A data structure of an index in which a plurality of nodes are hierarchized, each of the nodes including at least one entry indicating data being an index target, wherein the index includes a lower node, and an upper node including an entry having a link relationship with the lower node and indicating representative data, the representative data having a degree of similarity with respect to data indicated by the entry of the lower node that is equal to or greater than a similarity degree threshold value given to the link relationship, wherein a default similarity degree threshold value and an adjustment value are given to each link relationship between the entry of the upper node indicating the representative data and the lower node, wherein the similarity degree threshold value given to the link relationship is calculated by subtracting the adjustment value from the default similarity degree threshold value, and wherein the index is referred to by a computer in order for calculating the degree of similarity between the representative data indicated by the entry of the upper node and retrieval target data, comparing the degree of similarity with the similarity degree threshold value given to the link relationship of the entry of the upper node, and obtaining a retrieval result corresponding to the retrieval target data on the basis of a result of the comparison.

26. A computer-readable storage medium having the program according to 23. or 24. recorded thereon.

The application is based on Japanese Patent Application No. 2014-142107 filed on Jul. 10, 2014, the content of which is incorporated herein by reference.

The invention claimed is:

1. An index generation apparatus that generates an index in which a plurality of nodes are hierarchized, each of the nodes including at least one entry indicating data being an index target, the index generation apparatus comprising:

an index generation unit generating the index including a lower node and an upper node by using a degree of similarity between pieces of data, the upper node including an entry having a link relationship with the lower node and indicating representative data, the representative data having the degree of similarity with respect to data indicated by the entry of the lower node that is equal to or greater than a similarity degree threshold value given to the link relationship; and a threshold value determination unit determining a default similarity degree threshold value and an adjustment value with respect to each link relationship between the upper node and the lower node, and determining each similarity degree threshold value to be given to each link relationship by subtracting the adjustment value from the default similarity degree threshold value.

2. The index generation apparatus according to claim 1, wherein the threshold value determination unit determines the adjustment value so that the adjustment value becomes smaller as the default similarity degree threshold value becomes larger.

3. The index generation apparatus according to claim 1, wherein the threshold value determination unit sets the default similarity degree threshold value to be a value that becomes larger as a hierarchy gets lower, and sets the adjustment value to be a value which becomes smaller as a hierarchy gets lower.

4. The index generation apparatus according to claim 1, wherein the threshold value determination unit determines the adjustment value regarding the link relationship to be a value which becomes smaller as a degree of dispersion of degrees of similarity between the representative data indicated by the upper node and each of a plurality of data indicated by entries of the lower node becomes smaller.

5. The index generation apparatus according to claim 4, wherein the threshold value determination unit determines a value, obtained by dividing a standard deviation of the degrees of similarity between the representative data indicated by the upper node and each of the plurality of data indicated by the entries of the lower node by the number of entries of the lower node, to be the adjustment value regarding the link relationship.

6. The index generation apparatus according to claim 1, further comprising:
   a target acquisition unit acquiring index target data; and
   a similarity degree acquisition unit acquiring degree of similarity between the representative data indicated by the entry of the upper node and the index target data acquired by the target acquisition unit,
   wherein the index generation unit compares the degree of similarity acquired by the similarity degree acquisition unit with the similarity degree threshold value calculated from the default similarity degree threshold value and the adjustment value, and determines an insertion destination of a new entry indicating the index target data to be the upper node or the lower node on the basis of a result of the comparison,
   wherein the index generation unit includes:
   a representative selection unit selecting the representative entry from a target entry set including the entry included in a target node determined to be the insertion destination of the new entry, and the new entry, and
   an overflow adjustment unit selecting, from the target entry set other than the selected representative entry, the entry indicating data having the degree of similarity with respect to data indicated by the selected representative entry that is equal to or greater than a new default similarity degree threshold value or a new similarity degree threshold value determined by the threshold value determination unit in a case where the number of entries of the target entry set exceeds an entry threshold value, generating the lower node including the selected entry, setting the link relationship with the lower node in the selected representative entry of the target node, and giving a new default similarity degree threshold value and a new adjustment value to the link relationship.

7. The index generation apparatus according to claim 1, further comprising:
   a target acquisition unit acquiring index target data; and
   an entry adjustment unit determining an entry threshold value indicating a maximum number of entries within a node, with respect to each of the plurality of nodes,
   wherein the entry adjustment unit determines whether to change the entry threshold value regarding the lower node on the basis of a distribution state of a group of degrees of similarity between the representative data and each of a plurality of data indicated by a plurality of entries included in the lower node, and the index target data, in a case where an insertion destination of the entry indicating the index target data is determined to be the lower node by the index generation unit.

8. The index generation apparatus according to claim 7, wherein the entry adjustment unit determines whether or not the number of entries within the lower node exceeds the entry threshold value in a case where the entry indicating the index target data is inserted into the lower node, performs detection of an abnormal value on the degree of similarity between the representative data and each of the plurality of data and the index target data in a case where the number of entries exceeds the entry threshold value, increments the entry threshold value in a case where the abnormal value is not detected, and does not change the entry threshold value in a case where the abnormal value is detected.

9. An index generation method of generating an index in which a plurality of nodes are hierarchized, each of the nodes including at least one entry indicating data being an index target, the index generation method executed on a hardware device comprising:
   generating the index including a lower node and an upper node, the upper node including an entry having a link relationship with the lower node and indicating representative data, the representative data having a degree of similarity with respect to data being indicated by the entry of the lower node that is equal to or greater than a similarity degree threshold value given to the link relationship;
   determining a default similarity degree threshold value and an adjustment value with respect to each link relationship between the upper node and the lower node; and
   determining each similarity degree threshold value to be given to each link relationship by subtracting the adjustment value from the default similarity degree threshold value.

10. The index generation method according to claim 9, further comprising:
    acquiring index target data; and
    determining an entry threshold value indicating a maximum number of entries within a node, with respect to each of the plurality of nodes,
    wherein the determining of the entry threshold value includes determining whether to change the entry threshold value regarding the lower node on the basis of a distribution state of a group of degrees of similarity between the representative data and each of a plurality of data indicated by a plurality of entries included in the lower node, and the index target data, in a case where an insertion destination of the entry indicating the index target data is determined to be the lower node.

11. A non-transitory computer-readable storage medium that stores a program causing at least one computer to perform the index generation method according to claim 9.

12. A data structure of an index executed on a hardware device in which a plurality of nodes are hierarchized, each of the nodes including at least one entry indicating data being an index target,
    wherein the index comprises:
    a lower node, and
    an upper node including an entry having a link relationship with the lower node and indicating representative data, the representative data having a degree of similarity with respect to data indicated by the entry of the lower node that is equal to or greater than a similarity degree threshold value given to the link relationship,
    wherein a default similarity degree threshold value and an adjustment value are given to each link relationship between the entry of the upper node indicating the representative data and the lower node,
    wherein the similarity degree threshold value given to the link relationship is calculated by subtracting the adjustment value from the default similarity degree threshold value, and wherein the index is referred to by a computer in order for calculating the degree of similarity between the representative data indicated by the entry of the upper node and retrieval target data, comparing the degree of similarity with the similarity degree threshold value given to the link relationship of the entry of the upper node, and obtaining a retrieval result corresponding to the retrieval target data on the basis of a result of the comparison.

* * * * *